(12) United States Patent
Kuznia et al.

(10) Patent No.: US 10,551,572 B2
(45) Date of Patent: Feb. 4, 2020

(54) FIBER OPTIC END-FACE TRANSPARENT PROTECTOR SYSTEM AND METHOD

(71) Applicant: Ultra Communications, Inc., Vista, CA (US)

(72) Inventors: Charles B. Kuznia, Encinitas, CA (US); Man W. Wong, San Diego, CA (US)

(73) Assignee: Ultra Communications, Inc., Vista, CA (US)

( * ) Notice: Subject to any disclaimer, the term of this patent is extended or adjusted under 35 U.S.C. 154(b) by 0 days.

(21) Appl. No.: 16/200,139

(22) Filed: Nov. 26, 2018

(65) Prior Publication Data

US 2019/0353851 A1 Nov. 21, 2019

Related U.S. Application Data

(63) Continuation-in-part of application No. 15/699,484, filed on Sep. 8, 2017, now Pat. No. 10,162,124, which (Continued)

(51) Int. Cl.
*G02B 6/38* (2006.01)

(52) U.S. Cl.
CPC .......... *G02B 6/3849* (2013.01); *G02B 6/382* (2013.01); *G02B 6/3882* (2013.01); *G02B 6/3885* (2013.01)

(58) Field of Classification Search
CPC .... G02B 6/3847; G02B 6/3849; G02B 6/382; G02B 6/3882; B32B 7/06; B32B 7/12;
(Continued)

(56) References Cited

U.S. PATENT DOCUMENTS 7,219,979 B2    5/2007   Spivey et al.
7,540,584 B2    6/2009   Bertelsen et al.
(Continued)

FOREIGN PATENT DOCUMENTS

GB        2100465      12/1982

OTHER PUBLICATIONS

Tavlykaev, Robert Fuatovich, Notice of Allowance received from the USPTO dated Aug. 16, 2018 for U.S. Appl. No. 15/699,484, 24 pgs.
(Continued)

*Primary Examiner* — Robert Tavlykaev
(74) *Attorney, Agent, or Firm* — Jaquez Land Greenhaus LLP; John Land, Esq.; Alessandro Steinfl, Esq.

(57) ABSTRACT

A protective assembly method using a transparent layer within the fiber interconnect system aids in optical coupling by preventing an air gap from forming between the fiber cores within a connector. A fiber protection device made of a thin transparent film, which includes an adhesive layer, is applied over the fiber end-faces at the connector interface, the film having characteristics which allows it to conform to the fiber end and minimize coupling loss between fibers. According to one aspect, the film is part of a cartridge that provides structural support for the film to facilitate application of the fiber protection device. The film may be divided by perforate patterns that define one or more fiber protection devices formed by the film. The assembly method can include usage of an applicator base plate upon which the cartridge is mounted. According to another aspect, the film may be part of a single-use disposable pod for application of a single fiber protection device.

22 Claims, 33 Drawing Sheets

Related U.S. Application Data is a continuation of application No. 14/752,986, filed on Jun. 28, 2015, now Pat. No. 9,784,924.

(60) Provisional application No. 62/019,405, filed on Jun. 30, 2014.

(58) Field of Classification Search
CPC ........ B32B 27/00; B31D 1/021; C09J 7/0207; C09J 7/0228; C09J 7/0246; C09J 7/0296
USPC ................ 385/60, 71, 72, 77, 78, 134, 147; 156/99, 101–103, 106, 268, 288, 358, 156/361, 719; 428/40.1, 41.7, 41.8, 42.3, 428/43
See application file for complete search history.

(56) References Cited

U.S. PATENT DOCUMENTS

| | | | |
|---|---|---|---|
| 8,083,321 B2 | 12/2011 | Krawczyk et al. | |
| 8,334,036 B2* | 12/2012 | Buchbinder | G09F 3/0288 428/343 |
| 10,162,124 B2 | 12/2018 | Kuznia et al. | |
| 2003/0217806 A1* | 11/2003 | Tait | B23K 26/0846 156/254 |
| 2008/0104917 A1* | 5/2008 | Whelan | C09J 7/29 52/408 |
| 2009/0078671 A1 | 3/2009 | Triquet et al. | |
| 2010/0233410 A1* | 9/2010 | Abrams | B05D 1/16 428/41.6 |
| 2013/0287987 A1* | 10/2013 | Koch | G02B 1/14 428/41.7 |
| 2015/0266262 A1* | 9/2015 | Hill | B32B 38/04 428/138 |
| 2018/0284358 A1* | 10/2018 | Lu | B08B 7/0028 |

OTHER PUBLICATIONS

Tavlykaev, Robert Fuatovich, Office Action received from the USPTO dated Apr. 5, 2019 for U.S. Appl. No. 16/194,184, 14 pgs.

Tavlykaev, Robert Fuatovich, Final Office Action received from the USPTO dated Sep. 12, 2019 for U.S. Appl. No. 16/194,184, 19 pgs.

* cited by examiner

FIBER OPTIC END-FACE TRANSPARENT PROTECTOR SYSTEM AND METHOD

CROSS REFERENCE TO RELATED APPLICATIONS

The present application is a continuation-in-part of U.S. patent application Ser. No. 15/699,484 filed Sep. 8, 2017, which, in turn is a continuation of U.S. patent application Ser. No. 14/752,986, filed Jun. 28, 2015 (now U.S. Pat. No. 9,784,924 issued Oct. 10, 2017), which claims the benefit of U.S. Provisional Patent Application No. 62/019,405, filed Jun. 30, 2014, the contents of all of which are hereby incorporated by reference in their entirety.

The present application is related to U.S. application Ser. No. 16/200,167 entitled "Single-Use Disposable Pod for Application of an Optical Fiber Protection Device" filed on even date herewith and incorporated herein by reference in its entirety.

TECHNICAL FIELD

The present disclosure relates to fiber optic connector interfaces and methods for applying same. Embodiments according to the present disclosure aid in protecting the tip of a fiber, especially the region that guides light, while allowing light coupling between fibers. The embodiments according to the present disclosure can be used to protect fiber optic connector end-faces during the manufacturing process of cables and also during the general use of fiber optic cables.

BACKGROUND

Fiber optic cables are often connected together by aligning and pressing the ends of two fibers together. The end of the fibers (the 'end-faces') are typically polished smooth and flat, or at an angle. The optical coupling occurs between the cores of the fibers, which is the central portion of the fiber that guides the optical energy. The types of fiber can be single-mode-fiber (SMF), with a core that is usually 9 microns in diameter, or multi-mode-fiber (MMF), with a core that is much larger, but typically between 50 to 100 microns in diameter. Efficient optical coupling occurs when the cores of the two fibers are aligned and in physical contact. Ideally, nearly 100% of the light is coupled between the two fibers, but in practice, a loss of up to 0.3 dB may be acceptable.

Imperfections in the fiber end-face polished surface or contamination trapped between the cores of the fibers can reduce the efficiency of the optical coupling. These imperfections can also create an increased amount of back-reflected light from the connector interface. Imperfections can arise during the handling and use of the fiber. Imperfections can be in the form of scratches or other mechanical damage to the end-face of the fiber. Contamination can result from liquid sources or oils on the fiber end-face. Contamination can also result from particles trapped within the fiber-to-fiber interface. Particles can originate from the connector itself, for example, from the regions where the mechanical alignment mechanisms engage (such as guide holes), or from external sources, such as dust in the environment outside the connector. A trapped particle can further damage the end-face polish if the particle hardness is similar or greater that the glass in the fiber core. A particle can create scratches on the fiber end-face.

The optical coupling efficiency between the two fiber cores is reduced if the fiber cores are not in physical contact and an air gap is created between the cores. An air gap will create a Fresnel reflection of approximately 4% at each of the two core-to-air interfaces, a double Fresnel reflection. If this light is coherent, the interference of the reflections can create additional coupling loss.

Multi-fiber connectors are designed to bring two arrays of fiber end-faces into alignment and create physical contact between the fiber cores. The manufacturing process typically polishes the fiber connector end-face, polishing multiple fibers simultaneously. The polishing process typically leaves the tips of the fibers slightly protruding from the connector face by 1 to 3 microns. This allows two connectors to mate and have the fiber end-faces make physical contact.

The protrusions of the fiber tips on the connector are not typically perfectly uniform. The polishing process may leave a taper or a curvature across the array. Therefore, there is a provision in the connector to allow the fibers to recess under pressure. A spring can be provided within the connector to create the pressure. As two fiber connectors mate, the fibers that have a greater protrusion will come into contact first. Under pressure, these two fibers will recede into their connector until fibers with less protrusion make physical contact.

A failure in the recess mechanism may make a fiber fail to rebound after it has been recessed. This failure is called 'pistoning'. The fiber tip has been pressed down into the connector, but does not restore to a protruding state after un-mating of the connector. Pistoning can cause failure of a subsequent mating, as the fiber is not protruding enough to create physical contact.

Damage may occur to the fiber end-face during the process of manufacturing the fiber optic cable. There may be steps of handling the cable for testing, inspection or installation of the cable into a higher-level assembly. The manufacturer may ship the cable to a customer that further handles the cable before final installation into a network.

Fiber optics are finding use in applications that operate in harsh environments, such as aircraft, helicopters, unmanned vehicles, ship-board, space-craft and missiles. The fiber optic components must be able to operate and survive in an environment with severe shock, vibration, exposure to liquid contaminates, and over wide temperature ranges (such a −55 C to 125 C). These environmental stresses can cause the fiber end-faces, in physical contact within a connector, to become damaged or contaminated. Damage may occur when a particle trapped in the optical interface is moved along the fiber end-face due to vibration, shock or thermal expansion/contraction. This movement may leave scratches on the polish surface of the fiber end-face. An environment that exposes the connector to liquid contaminate can compromise optical coupling if the liquid enters into an air gap between two fiber cores.

Therefore, there has been a long-standing need for systems and methods for providing more precise fiber end coupling. Details of such systems and methods are provided below.

SUMMARY

The following presents a simplified summary in order to provide a basic understanding of some aspects of the claimed subject matter. This summary is not an extensive overview, and is not intended to identify key/critical elements or to delineate the scope of the claimed subject matter.

Its purpose is to present some concepts in a simplified form as a prelude to the more detailed description that is presented later.

According to a first aspect of the present disclosure, a system for application of one or more optical fiber protection devices to fiber ferrule end-faces is presented, the system comprising: a cartridge comprising stacked layers of a substantially same planar shape arranged one above another, comprising in order from a top layer to a bottom layer: a mechanical support comprising alignment openings that correspond to a profile of a fiber ferrule end-face; an adhesive film adhered to a bottom surface of the mechanical support, the adhesive film comprising perforate patterns that are aligned with the alignment openings and define outlines of the one or more optical fiber protection devices formed in the adhesive film; an applicator base plate used for mounting of the cartridge during application of the optical fiber protection device, and a cushion layer, formed by a compressible material, that is arranged during application of the optical fiber protection device, below the adhesive film of the stacked layers and above the applicator base plate, wherein when applied to the fiber ferrule end-face, an optical fiber protection device of the one or more optical fiber protection devices flexibly conforms around exposed optical fiber ends in the fiber ferrule end-face.

According to a second aspect of the present disclosure, a method for protecting a fiber ferrule end-face is presented, the method comprising: providing the above described system; mounting the cartridge of said system on the applicator base plate, the applicator base plate having a main body of a substantially planar shape with dimensions equal to or greater than dimensions of the cartridge; based on the mounting, orienting an adhesive side of the adhesive film away from the main body; inserting an end portion of the fiber ferrule end-face through an alignment opening of the mechanical support; based on the inserting, adhering an optical fiber protection device of the one or more fiber protection devices onto the fiber ferrule end-face; and pressing the end portion of the fiber ferrule end-face thereby releasing the optical fiber protection device from the cartridge.

BRIEF DESCRIPTION OF DRAWINGS

FIG. 10 shows two fiber connectors mated with an exemplary fiber protection device in-between.

FIG. 11 shows two fiber connectors mated with two exemplary fiber protection devices in-between.

DETAILED DESCRIPTION

Figure 1A:
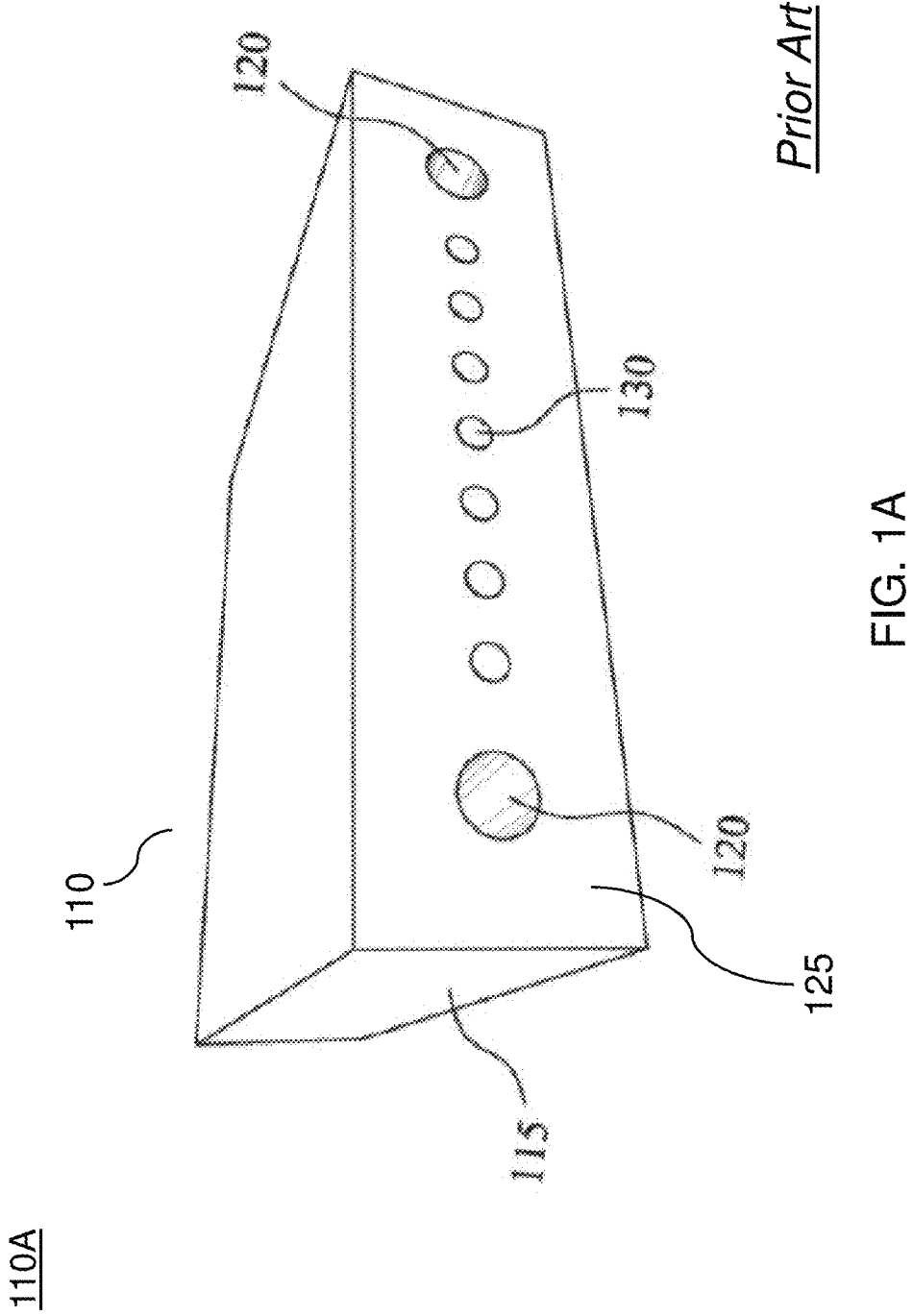
FIG. 1A shows a perspective front view of a prior art multi-fiber connector.

The exemplary fiber optic interface system, and the assembly method of a transparent layer within the interconnect system, are described in this application. This system creates a fiber optic interface system that places a thin transparent film, referred to herein as a fiber protection device or a protection device, over the fiber end-faces at the connector interface. This system can use a (removable) film, designed to be removed or replaced if necessary. The film is thin and transparent creating minimal additional coupling loss between to fibers. The additional coupling loss can be small enough to allow fiber optic cable testing and general use with the layer in place.

The system aids in optical coupling by preventing an air gap from forming between the fiber cores within a connector. The system may also prevent damage to the fiber end-faces during cable manufacturing and general use. The system may prevent foreign objects or liquids from becoming trapped between the fiber cores within a connector.

The film that makes the protection device is applied in a manner that covers the end-faces of fibers at a connector interface. The film supplies compliance to allow the fiber end-faces to embed themselves into the film, making physical contact between the fiber core and the film. The film can be made up of multiple layers, such as an adhesive layer and a structural layer. The adhesive layer can allow the film to be applied and removed from the fiber end-faces. Ideally, the adhesive layer leaves no residues on the fiber end-faces after removal.

The film can be part of a cartridge with a stacked layer construction that includes a mechanical support for holding the film. The mechanical support can include alignment patterns/openings/holes to facilitate application of the fiber protection device to a connector end-face. The film may be divided by perforate patterns that define one or more fiber protection devices formed by the film. The cartridge can also provide protection to an adhesive side of the film by way of a cover tape.

The cover tape may include perforate patterns for individual protection of the adhesive side of each of the protection devices formed in the film. Such perforate patterns of the cover tape allow easy removal of a portion of the cover tape corresponding to a protection device to be applied, thereby exposing the adhesive side of the protection device for application on a connector end-face. The film and the cover tape may be adhesively applied onto opposite faces of the mechanical support.

Each of the one or more protection devices may be applied to one or more connector end-faces using a same cartridge. Application of the protection device using the cartridge can include aligning the fiber connector end-face to the film via alignment patterns/holes formed into the cartridge. According to an exemplary embodiment of the present disclosure, the cartridge, in combination with an applicator base plate, can provide a mechanical system for safe and efficient application of the protection device to a connector end-face. According to another embodiment of the present disclosure, the cartridge may be encased in a casing that in combination provide a similar mechanical system (e.g., referred herein as a pod) for safe and efficient application of the protection device. According to an exemplary embodiment, the pod according to the present teachings can be a single-use disposable pod that is configured to include a single protection device and disposed of after application.

Further protection against scratches and damage to the film of the protection device during application may be provided by sandwiching a cushion layer between the cartridge and the applicator base plate. The cushion layer may be made of a material that is soft enough not to scratch the film during application. Such material may be a flexible and/or compressible material that provides, during application, compliance to the connector end-face. In turn, such compliance may allow a substantially uniform force exerted between the connector end-face and the film so to promote uniform adhesion and outflow of any entrapped air between the connector end-face and the film. The material of the cushion layer may be compressible enough to allow breaking of the perforate patterns of the film that define the protection device and thereby releasing the protection device from the cartridge and onto the connector end-face. According to one embodiment of the present disclosure, the cushion layer may be pre-installed onto the applicator base plate and therefore considered part of the applicator base plate. According to another embodiment of the present disclosure, the cushion layer may be provided with each cartridge and therefore be considered part of the cartridge. In this case, the cushion layer permanently protects the film from scratches.

Applying the protection device to a fiber connector end-face may include mounting the cartridge onto the applicator base plate with the cushion layer sandwiched between the cartridge and the applicator base plate, the cushion layer making contact with the film. This results in a stacked layer configuration including, from bottom to top, the applicator base plate, the cushion layer, the film, the mechanical support, and the cover tape. Next, a portion of the cover tape corresponding to the protection device to be applied is removed (peeled off) by pulling and breaking corresponding perforate patterns of the cover tape. This in turn exposes the adhesive side of the film through openings (e.g., holes/patterns) provided in the mechanical support. Finally, the connector end-face is aligned with the openings and pressed through the openings, with a force exerted in the direction of the applicator base plate, against the film. The force causes the protection device to adhere onto the connector end-face. At the same time, the force causes the compressible cushion layer to compress and therefore break the perforate patterns corresponding to the protection device to be applied. Once the perforate patterns are broken, the protection device, now adhered onto the connector end-face, is released. Finally, the protected connector is pulled back through the openings of the mechanical support. Same steps can be performed to protect another connector end-face using a different protection device of the same cartridge, or alternatively, a different cartridge.

The exemplary system(s) and method(s) according to the present disclosure has application in the general field of fiber optic cables. It can be used during the manufacturing process to protect the fiber end-face, without sacrificing the ability to measure the optical coupling properties of the cable. It can be used to protect fiber cables that are found in higher-level assemblies (such as modules, or box-level solutions) during the manufacturing and test process of the assembly. The exemplary system(s) and method(s) can aid the connector performance in harsh environment applications; and can relax the polishing specifications normally required to create physical contact between fiber cores.

FIG. 1A is an illustration 110A of a prior art multi-fiber connector 110 that is made up of a ferrule 115 that holds fibers 130 aligned to each other and to an alignment mechanism 120. There are many types of alignment mechanisms 120, including, but not exclusively, guide pin and guide holes, features that are processed monolithically into the ferrule 115, or features that align the outer body of the ferrule 115, such as a sleeve. The alignment mechanism 120 provides a means to align two of the multi-fiber connectors 110 together during the mating of end-faces 125 of two sets of the fibers 130, so that light couples between the fibers. The fibers 130 can be polished or cleaved so that the ends of the fibers are roughly flat or at an angle. The fibers 130 and face 125 of the ferrule 115 can be polished together in a single processing step. The fibers 130 can protrude slightly from the ferrule 115 (e.g., end-face 125 of the ferrule) to allow for physical contact with another set of fibers (not shown) in a mating ferrule. A typical fiber protrusion is 1 to 3 microns. The fibers 130 can be mounted into the ferrule 115 using an adhesive that provides compliance to allow the fibers 130 to recess toward the ferrule 115 when pressure is applied to the ends of the fibers 130 during connector mating. It should be apparent that the exposed fiber 103 ends, renders them susceptible to contamination (from debris, dust, etc.) or even damage. To date, there is no known protection scheme other than the installer perhaps placing a rag over the multi-fiber connector 110 whilst preparing the mating connector. The following Figures show various improvements to the prior art.

Figure 1B:
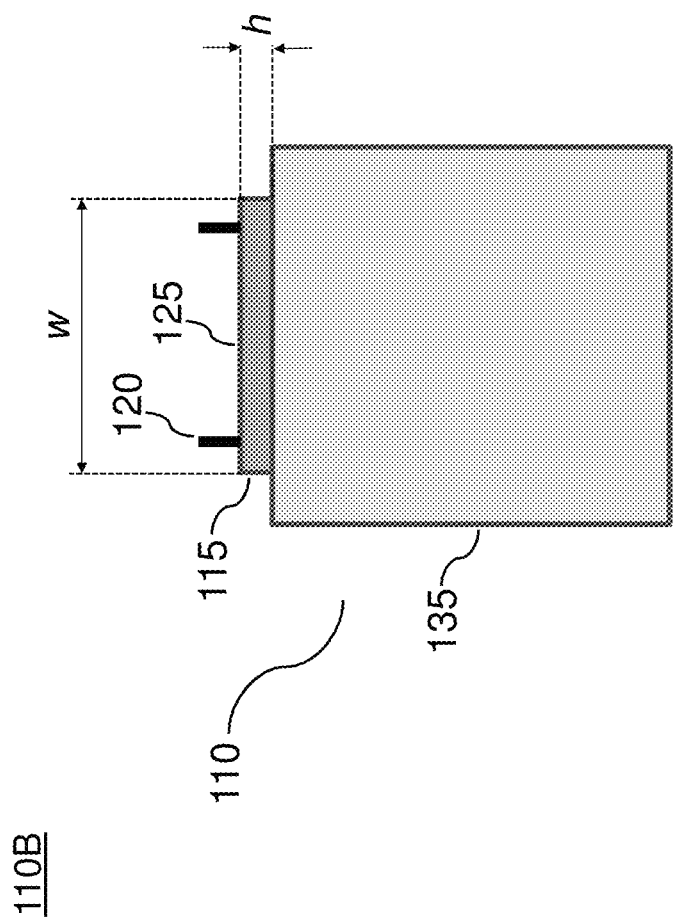
FIG. 1B shows a side view of the prior art multi-fiber connector of FIG. 1A.

FIG. 1B shows a side view of the connector 110 of FIG. 1A, where it is shown that a width w of an end portion (e.g., ferrule) 115 of the connector 110 that includes the end-face 125 may be narrower than a remaining portion 135 of the connector 110. As can be seen in FIG. 1B, a height h of the end portion 115 may also be smaller than a height of the remaining portion 135 of the connector 110. In the exemplary prior art connector 110 of FIG. 1B, the alignment mechanism of the connector is shown as guide pins 120.

Figure 2:
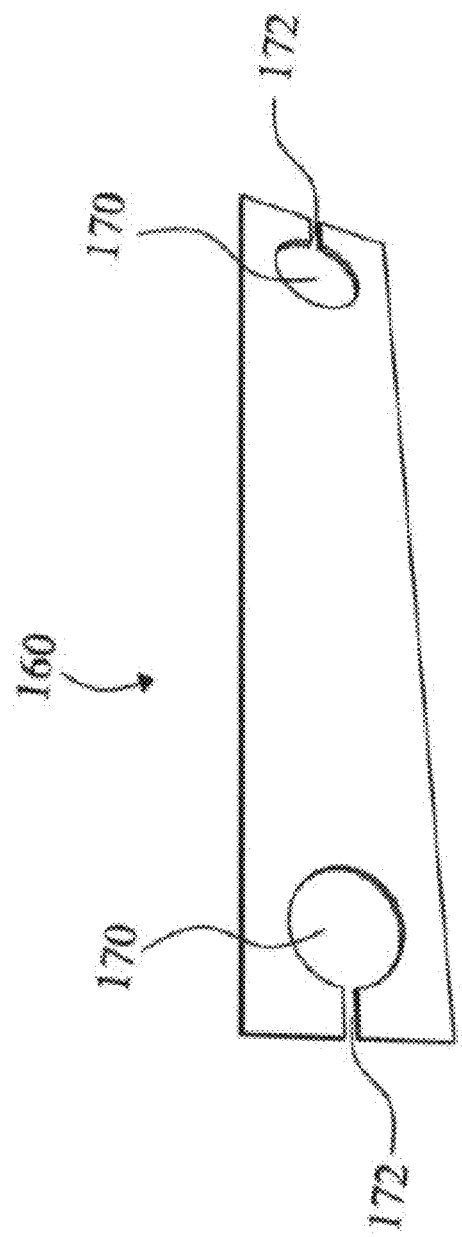
FIG. 2 shows an exemplary fiber protection device.

FIG. 2 shows one embodiment of an exemplary fiber protection device (protector) 150 comprising a transparent film 160. The film can have clearance 170 regions to prevent mechanical interference with alignment mechanisms 120, if present, or other features within the connector. The clearance 170 features can aid in alignment of the film to the ferrule 115 during the application process. The clearance 170 regions can have a clearance-to-edge slot 172 or other feature (micro slots around clearance 170, etc.) that eases the installation or removal of the fiber protection device 150. The film 160 is thin and in some embodiments is approximately less than 50 microns. The film should be soft enough to conform around the fiber end-face. In commercial embodiments, a Rockwell scale E hardness of the film in the range of approximately 30 and 150 was found to be effective. Of course, other values may be found effective, depending on the implementation. A non-exhaustive list of film materials that may be suitable are polyimide, polyethylene, polyurethane, and silicone. The fiber protection device 150 can be manufactured by cutting or stamping a pattern into a film. A laser could be used for cutting the film, as well as other suitable manufacturing methods. The fiber protection device 150 can be applied to a fiber connector 202 having one or more fibers.

Figure 3:
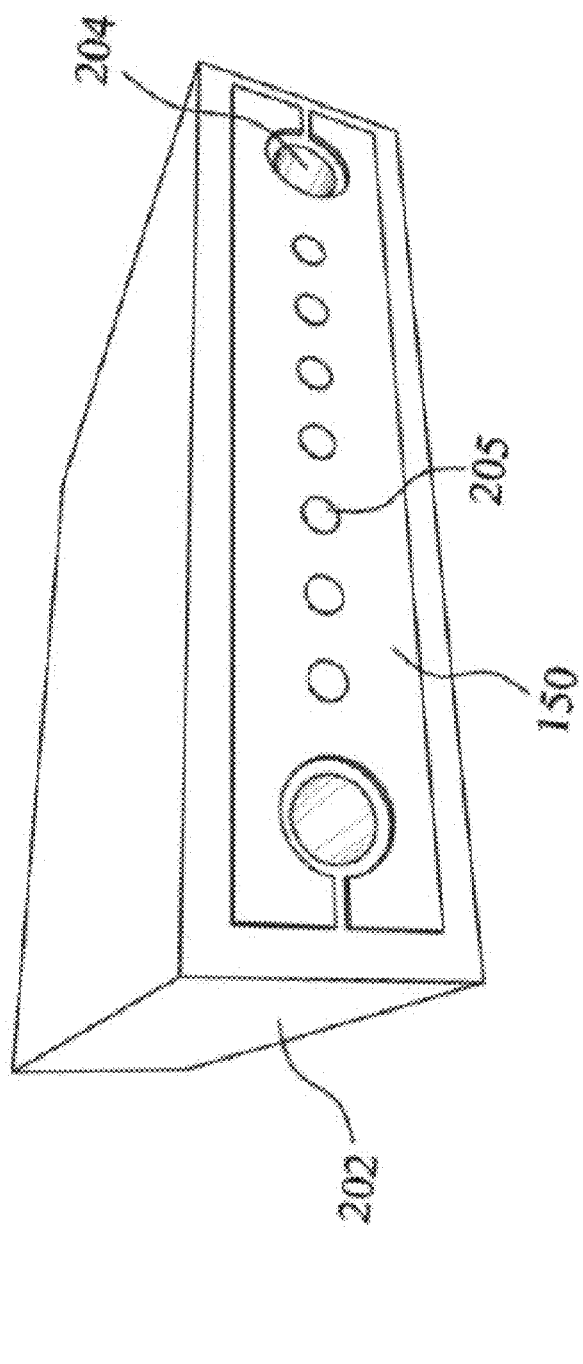
FIG. 3 shows an exemplary fiber protection device mounted on a multi-fiber connector.

FIG. 3 shows an exemplary fiber protection device 150 mounted on a prior art multi-fiber connector 202, creating a protected connector 200. The fiber protection device 150 covers the fiber(s) to create protected fiber(s) 205. The fiber protection device 150 can have a clearance around the alignment mechanism 204 on the fiber connector 202.

Figure 4:
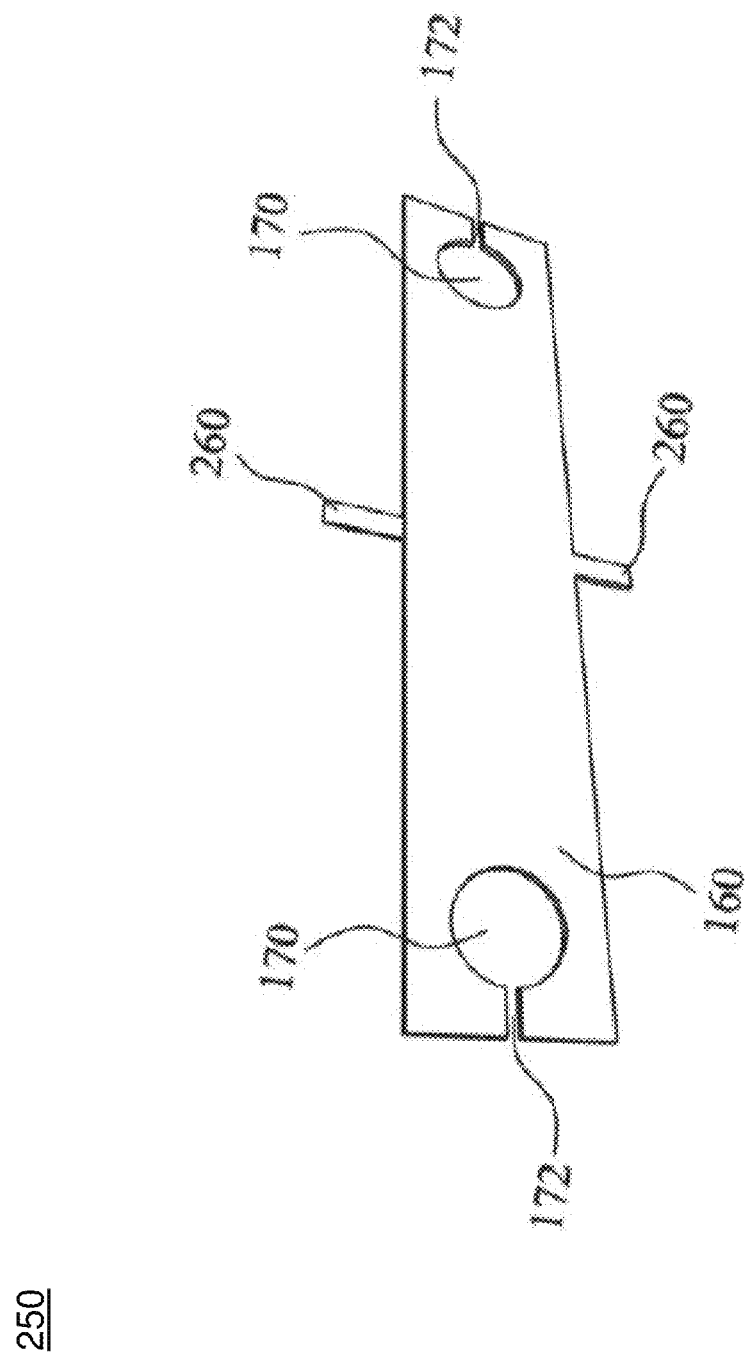
FIG. 4 shows an exemplary fiber protection device with tabs.

FIG. 4 shows an exemplary fiber protection device 250 with extending tabs 260. In this exemplary embodiment according to the present disclosure, tabs 260 are provided onto the fiber protection device 250 to ease in the removal of the film 160. The tabs 260 can be placed in an area convenient to grasp that does not interfere with the overall operation of the connector and be of any suitable shape or size.

Figure 5:
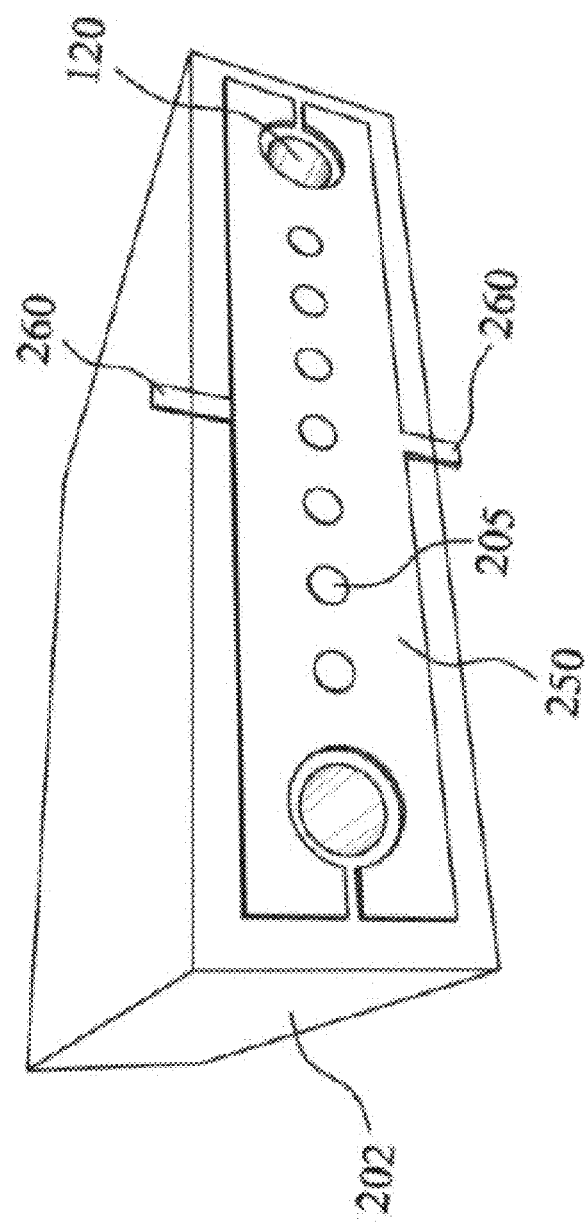
FIG. 5 shows an exemplary fiber protection device with tabs mounted on a multi-fiber connector.

FIG. 5 shows a multi-fiber connector 202 with a mounted fiber protection device with tabs 250, creating a protected connector 300. In this exemplary embodiment according to the present disclosure, the tabs 260 are on two sides of the fiber protection device 250 and protrude above and below the fiber connector 202. It should be understood that while two tabs 260 are shown, less or more tabs 260 may be used, according to design preference.

Figure 6:
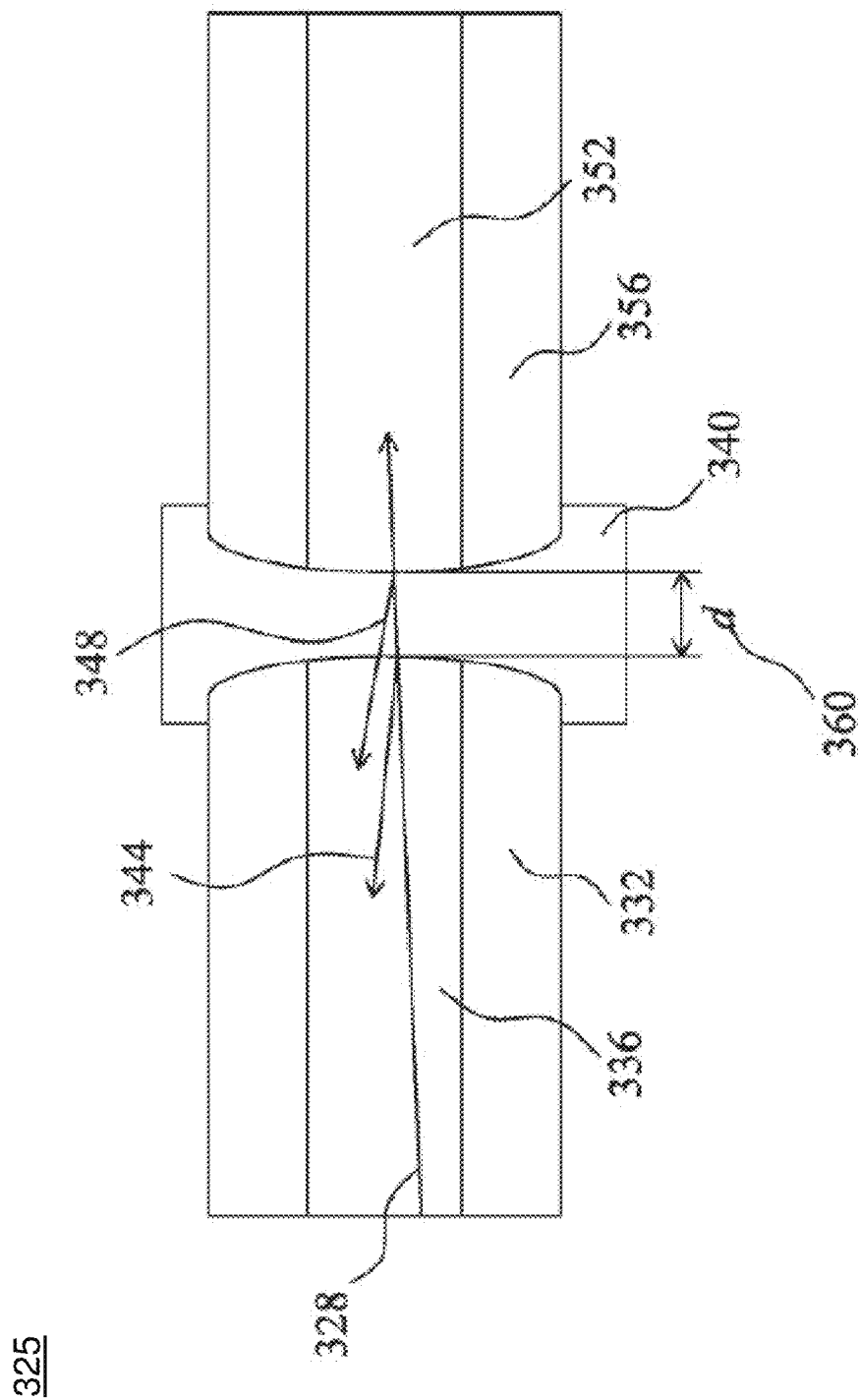
FIG. 6 shows an exemplary fiber optic coupling over a gap.

The transparent fiber protection device 250 creates a small gap between fibers within a fiber connection. FIG. 6 shows is a closeup side illustration showing the detail of fiber coupling over this gap from a transmit fiber to a receive fiber. The transmit fiber is made up of a transmit fiber core 336, which contains the light, and a transmit fiber cladding 332. Similarly, the receive fiber has a receive fiber core 352 and receive fiber cladding 356. The material for both the core and the cladding is glass having a different reflective index for the two regions. The objective is to couple optical energy efficiently (typically >90%) from the transmit core to the receive core. The light path 328 within the transmit core 336 will experience a transmit reflection 344 at the end of the transmit fiber, and a receive reflection 348 at the start of the receive fiber. These are Fresnel reflections, caused by the difference in the index of refraction of materials. Only when the gap 360 is reduced to zero thickness (d=0) are the reflections nearly eliminated, since the fiber core materials have a nearly identical index of reflections (i.e., the difference in index would result from fiber manufacturing non-uniformity). If the gap 360 contained air, the magnitude of the Fresnel reflections would be approximately 4%, resulting in 0.36 dB of optical signal loss from the combined transmit reflection 344 and receive reflection 348. If the gap 360 is filled with a transparent film 340 that nearly matches the fiber core index of refraction, the Fresnel reflections can be substantially reduced. Therefore, in commercial embodiments, a suitable index of refraction for the film was set to 1.5, the typical index of the fiber core. However, any film with an index of refraction between 1.1 and 2.2 will produce less reflection than an air gap.

The film 340 can also create loss due to light scattering and absorption. However, in a commercial embodiment, the amount of scattering and absorption is negligible (<1%).

Figure 7:
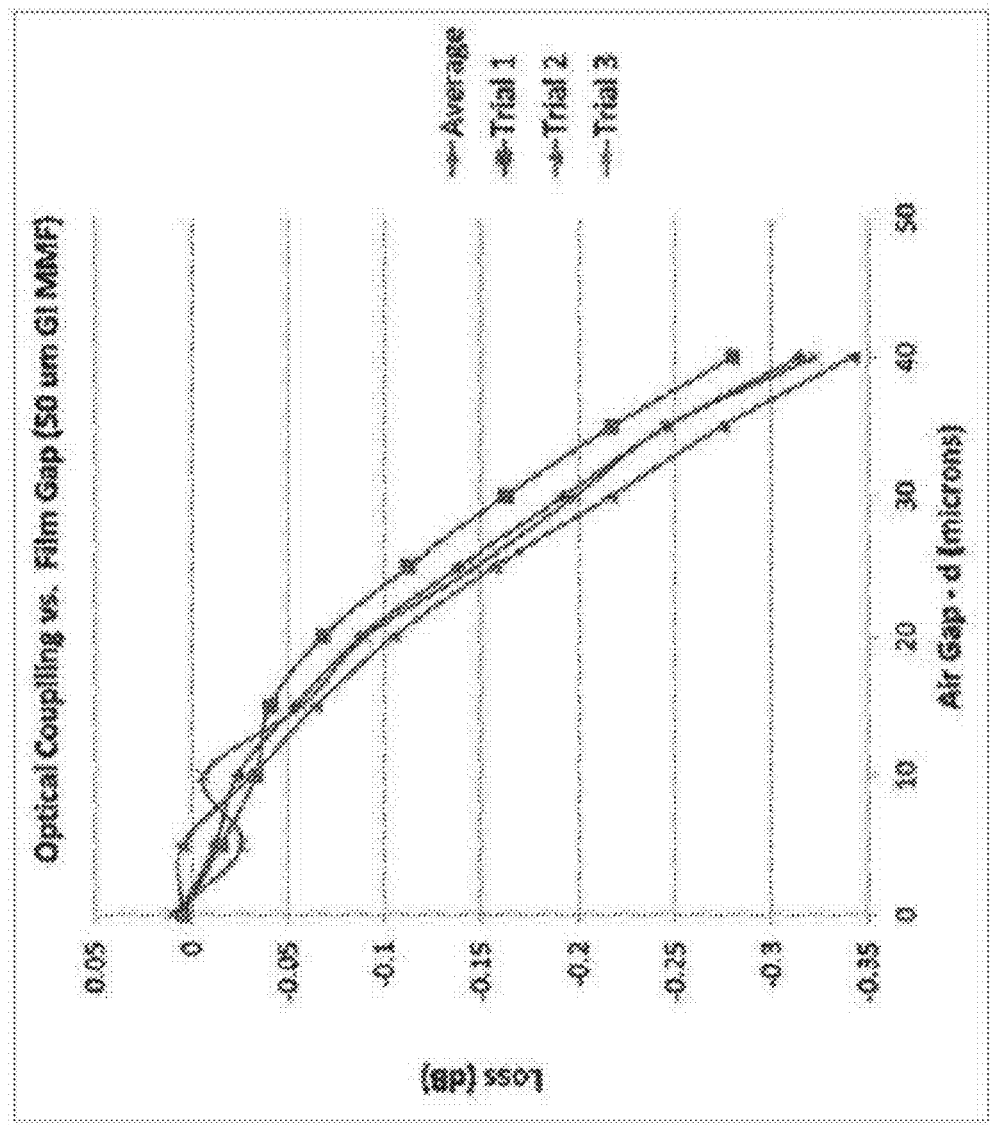
FIG. 7 shows a plot of an exemplary fiber optic coupling versus the width of the gap.

FIG. 7 is a plot showing measured results of fiber optic coupling between two fibers versus a film thickness. The type of fiber was a 50 micron graded index multi-mode fiber. The film was a polyethylene. The coupling was measured for gap 360 thickness d at steps of 5 microns with the gap filled with the film. A coherent laser source was used for this measurement, which shows up as some variations at gap thicknesses of d=5 microns and d=10 microns. If an application had an acceptable loss budget of −0.2 dB, a film thickness of roughly 25 microns would be expected to be acceptable with this film.

Figure 8:
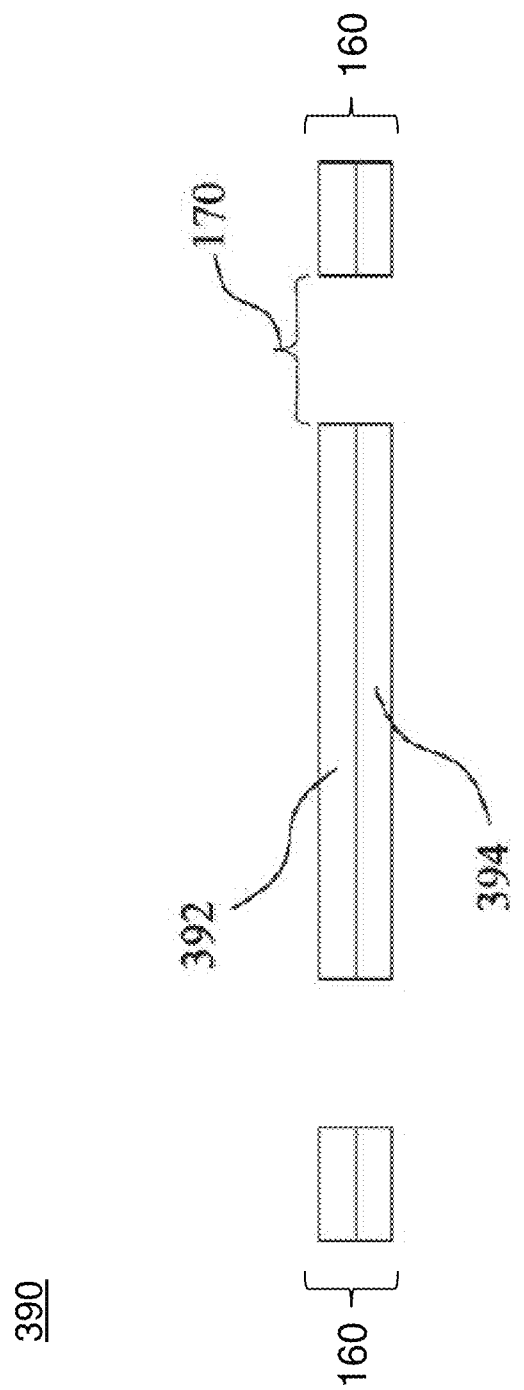
FIG. 8 shows an exemplary fiber protection device with an adhesive layer.

According to an embodiment of the present disclosure, as illustrated in the cross-sectional view 390 of FIG. 8, the transparent film 160 of the fiber protection device (e.g., 150 of FIG. 2, 250 of FIG. 4) can be a transparent adhesive tape that comprises a transparent adhesive layer 394 overlying a transparent film 392. The transparent adhesive layer 394 can aid securing the fiber protection device 150, 250, in place on the connector. The adhesive layer 394 should be thin, for example, less than 25 microns. In the process of making the fiber protection device 150, 250, clearance 170 areas can be formed in the film (transparent adhesive tape) 160. Silicone or acrylate adhesives are possible candidates for the transparent adhesive layer 394. Of course, other suitable adhesives may be used, according to design preference. The adhesive, in some embodiments, allows the fiber protection device 390 to be removed without leaving residue on the fiber connector 202. For outdoor environment applications, the transparent film (392) and the adhesive layer (394) should be chosen to survive in temperature extremes and in the presence of moisture.

The transparent film 392 can also be coated to improve the surface qualities for optical (i.e., anti-reflection or absorption coatings) and mechanical reasons. For example, the mechanical qualities can be improved with a diamond coating to provide resistance to scratches.

Figure 9:
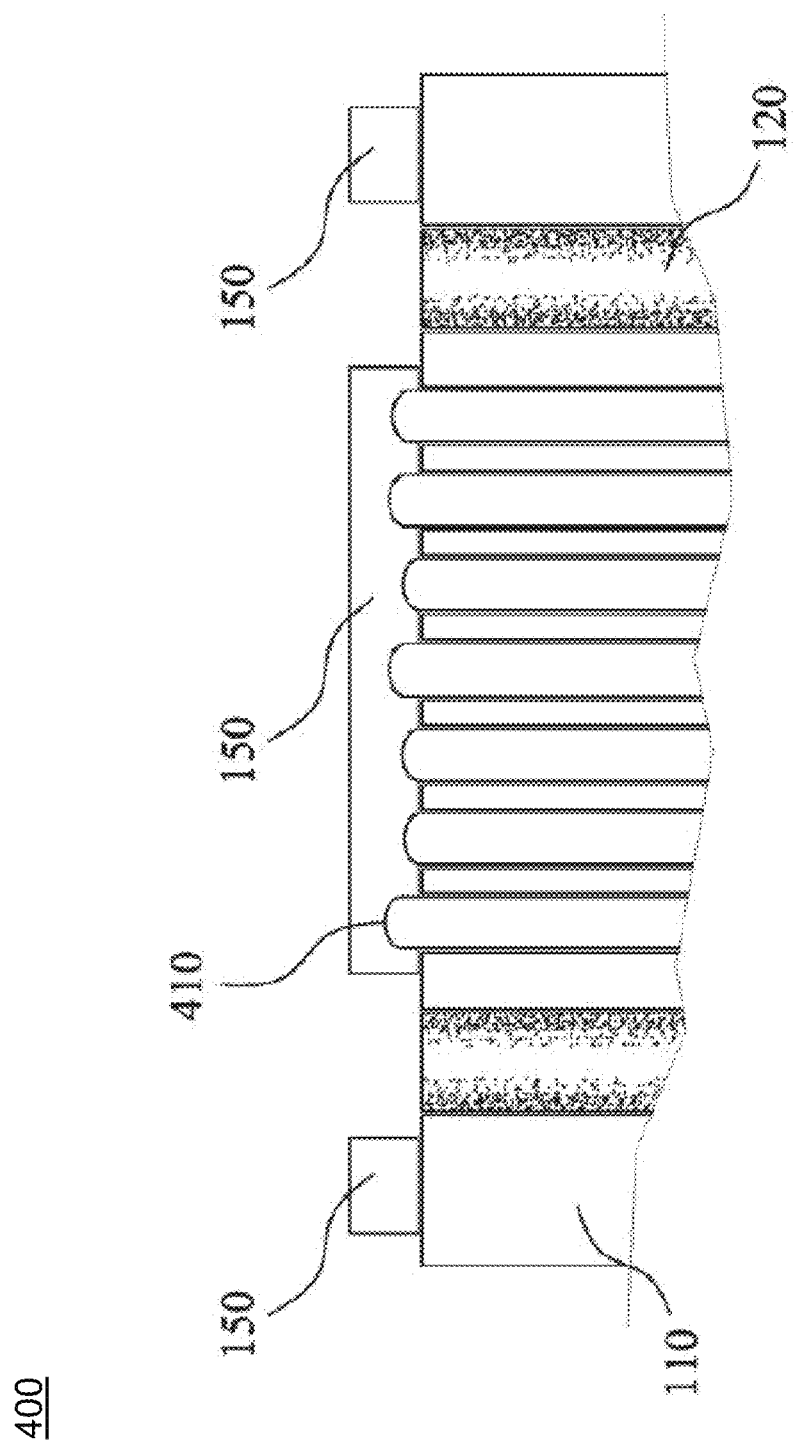
FIG. 9 shows a side view of an exemplary fiber protection devices on a multi-fiber connector.

FIG. 9 shows a top side, cut-away view 400 of a single fiber protection device 150 on a multi-fiber connector 100. The multi-fiber connector 110 has alignment mechanisms 120, such as a guide hole or guide pin, and fiber ends 410 that protrude. Due to manufacturing variations, the fiber ends 410 may not protrude uniformly across an array of fibers. The fiber ends 410 are in contact with the fiber protection device 150 is a manner that reduces the Fresnel reflections at this interface. The top surface of the fiber protection device 150 can be substantially flat.

Figure 10:
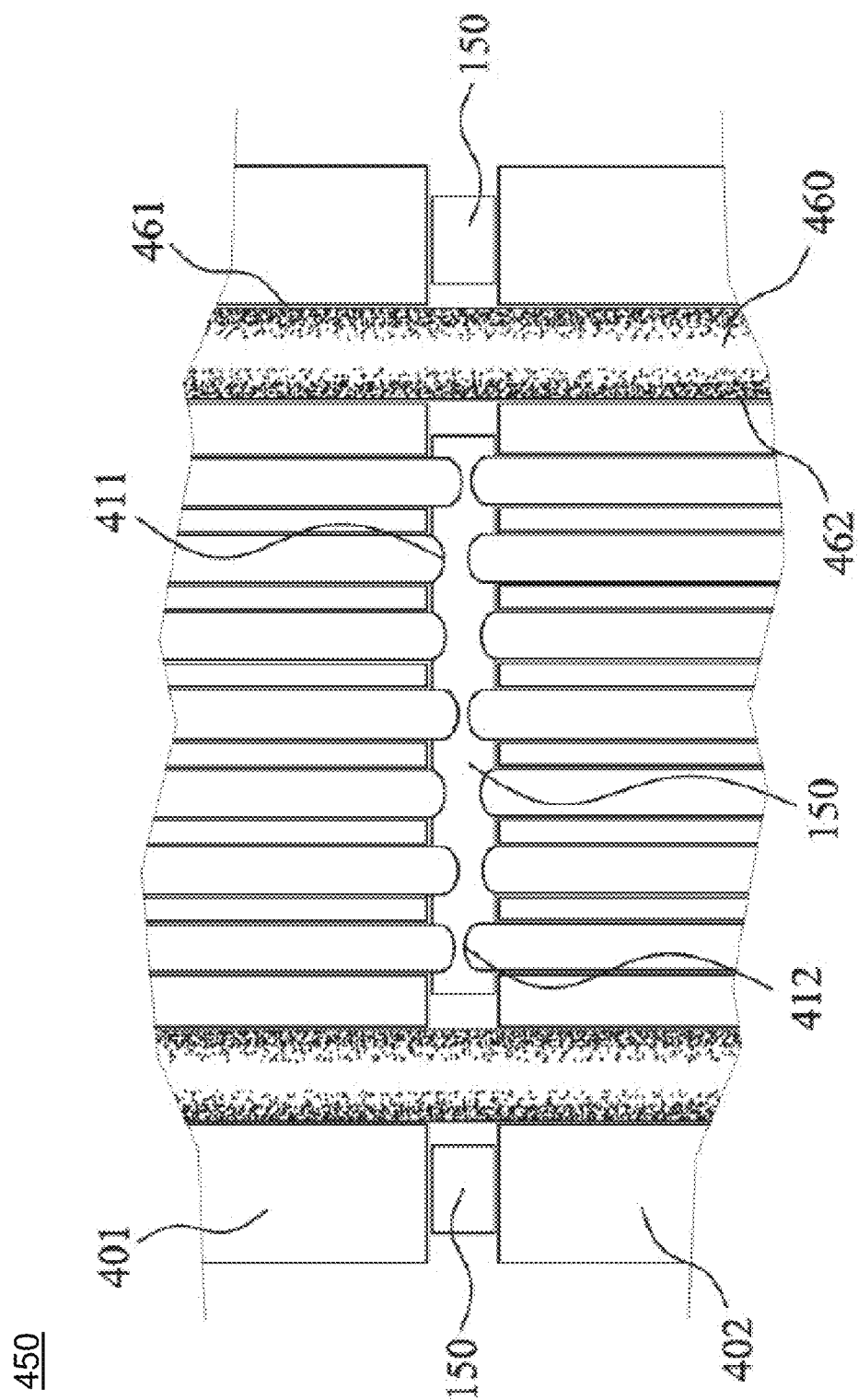

FIG. 10 shows a top side, cut-away view of a fiber connector 450 first side 401 mated to a fiber connector second side 402 so that one or more fibers are brought into alignment for the purpose of optical coupling. In this embodiment, a single fiber protection device 150 is shown. An alignment hole first side 461 is aligned to alignment hole second side 462 with an alignment pin 460. This shows one method of achieving alignment, however other methods are possible. A fiber protection device 150 is applied to fiber connector first side 401. The fiber ends first side 411 and fiber ends second side 412 are in physical contact with the fiber protection device 150. Light is coupled from the fiber ends first side 411 to the fiber ends second side 412.

Figure 11:
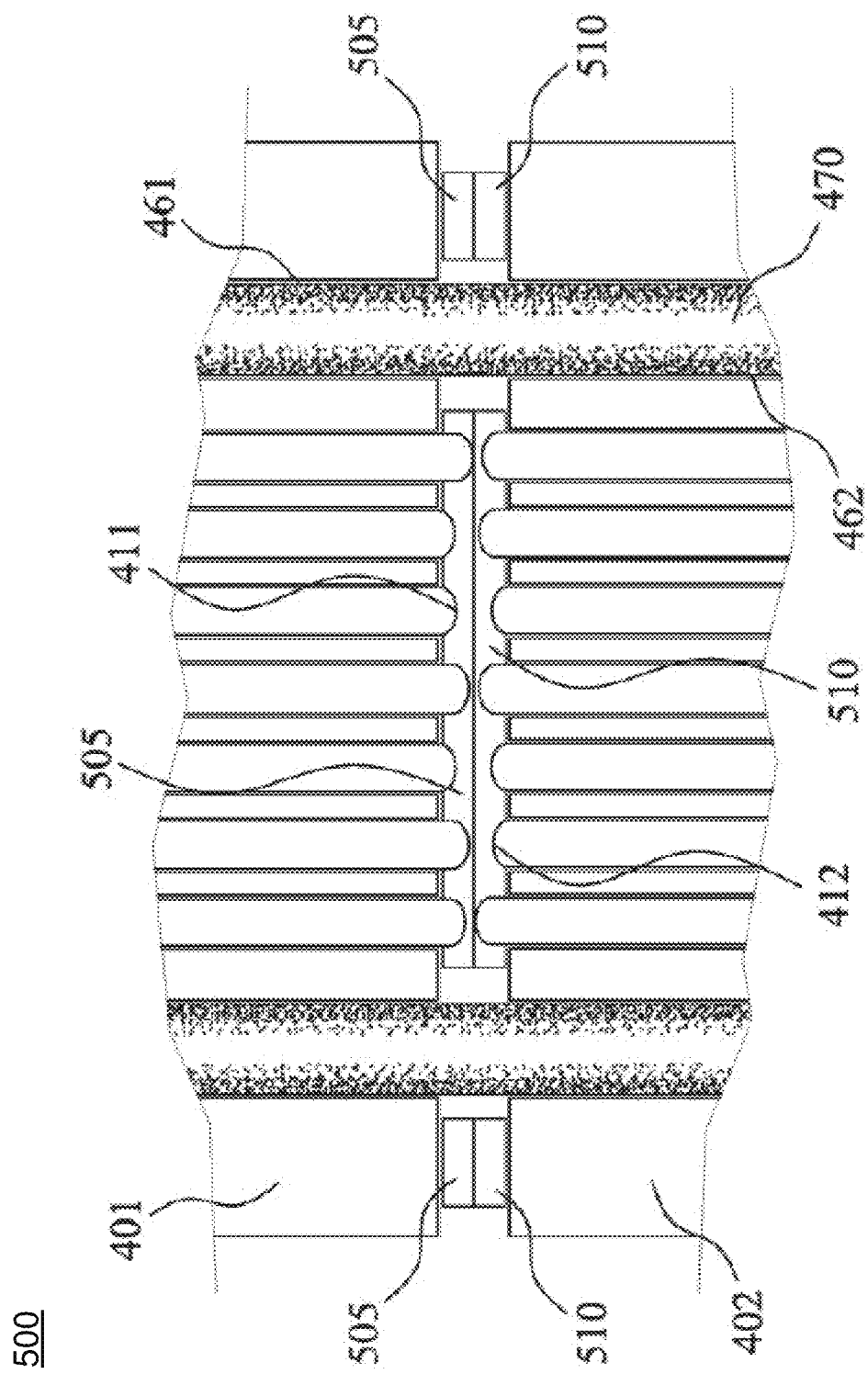

FIG. 11 shows a top side, cut-away view of a fiber connector 500 first side 401 mated to a fiber connector second side 402 so that one or more fibers are brought into alignment for the purpose of optical coupling. In this embodiment, two fiber protection devices are utilized between the respective connector fibers. An alignment hole first side 461 is aligned to alignment hole second side 462 with an alignment pin 460. This shows one method of achieving alignment, however other methods are possible. A first side fiber protection device 505 is applied to fiber connector first side 401. The fiber ends first side 411 are in physical contact with the first side fiber protection device 505. A second side fiber protection device 510 is applied to fiber connector second side 402. The fiber ends first side 412 are in physical contact with the second side fiber protection device 510. The first side fiber protection device 505 is in physical contact with the second side fiber protection device 510. Light is coupled from the fiber ends first side 411 to the fiber ends second side 412. Evident is the conforming of the fiber protection devices 505 and 510 to the ends 411 and 412 of the respective fibers, thus ensuring a non-air gap.

Figure 12A:
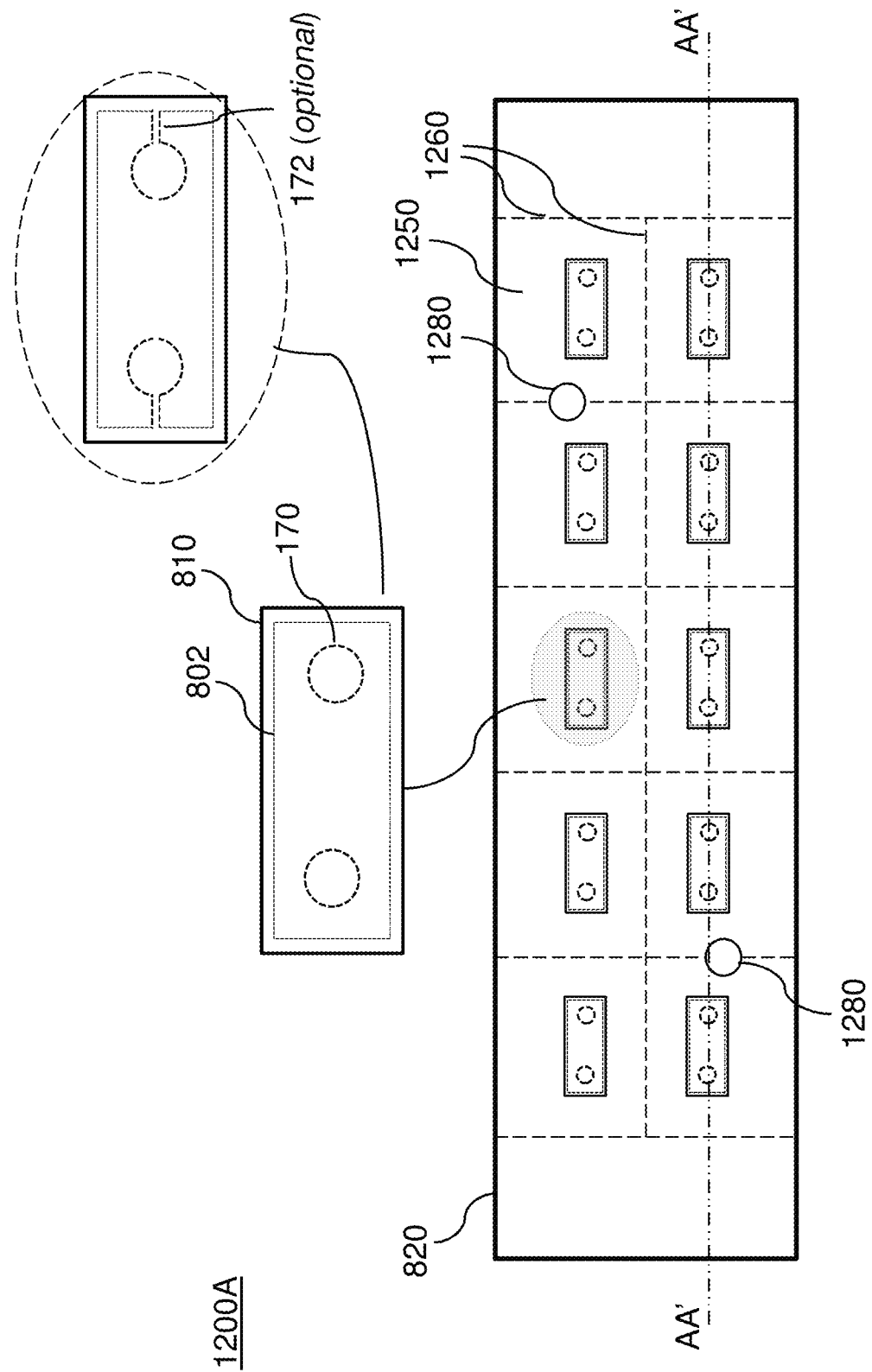
FIG. 12A shows a top plan view of an exemplary cartridge for applying the fiber protection device.

FIG. 12A shows a top plan view 1200A of an exemplary cartridge 820, according to an exemplary embodiment of the present disclosure, for applying the fiber protection device (e.g., 150 of FIG. 2, 250 of FIG. 4). As can be seen by the corresponding cross section view of FIG. 12B, the cartridge 820 may be formed by stacked layers, comprising a mechanical support 805, the film 160 adhered, via an adhesive side 825 of the film 160, onto one (bottom) face of the mechanical support 805, and a cover tape 1220 adhered onto the other (top) face of the mechanical support 805. A cushion layer 1230 may optionally be provided as a layer that is positioned beneath the film 160. The cushion layer 1230 may be formed by a material that naturally bonds, with a relatively weak force, to the film 160.

Figure 12B:
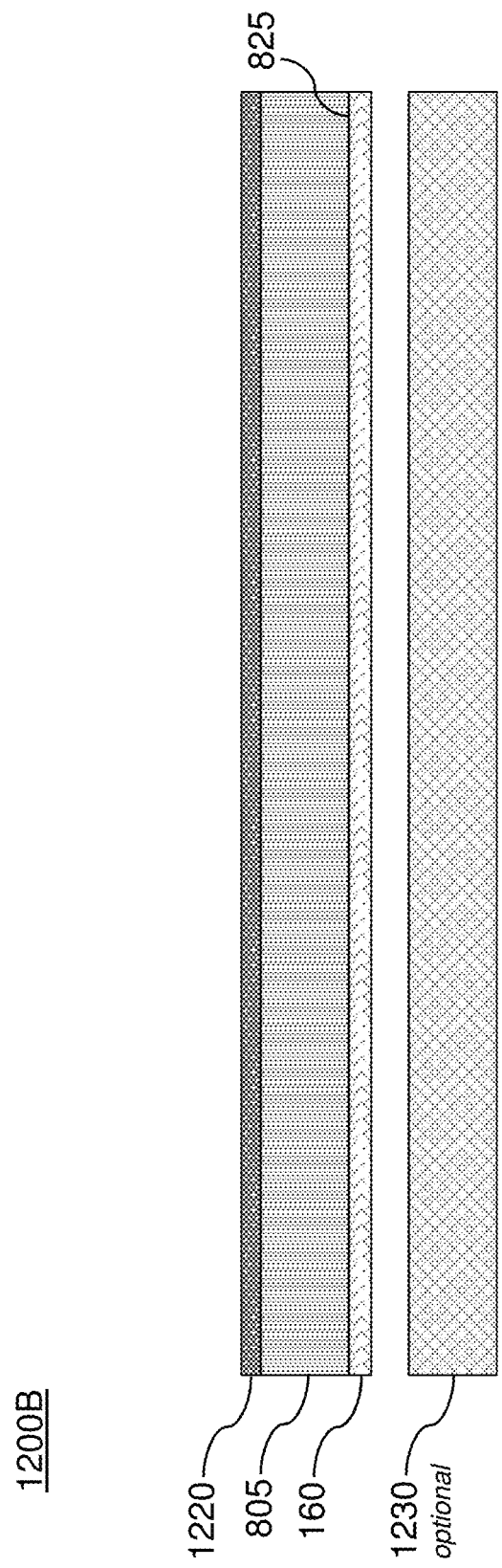
FIG. 12B shows a cross-sectional view of the exemplary cartridge of FIG. 12A comprising a plurality of stacked layers.

With further reference to FIGS. 12A and 12B, the mechanical support 805 can provide the mechanism of holding the film 160 and aligning of a fiber connector to the film 160 for application of the fiber protector device. The mechanical support 805 can be patterned with alignment openings 810 that correspond to a profile of the connector end-face (i.e., end portion (ferrule) 115 of the connector 110 of FIG. 1A-1B). During application of the fiber protection device to the connector end-face, the connector end-face is inserted through the alignment openings 810 which serve as alignment mechanism between the connector and the fiber protection device. Accordingly, the alignment openings 810 clear a contour (outer dimensions) of the connector end-face. Insertion of the connector end-face through the alignment openings 810 automatically positions the connector end-face in alignment with the protection device whose outlines are indicated in FIG. 12A by the perforate pattern 802. Also, insertion of the connector end-face through the alignment openings 810 automatically guides pins (if present, e.g., 120 of FIG. 1B) of the connector through the clearance 170 formed into the protection device. As will be discussed with reference to FIGS. 14 and 15, similar clearance 170 can be provided in the cushion layer (item 170 of FIG. 12G later described) and in the applicator base plate (item 1470 of FIG. 14, later described) for guiding of the pins. It should be noted that as shown in FIG. 12A, the fiber protection device may optionally include clearance-to-edge slots 172 or other micro slots around the clearance 170, as described above with reference to the exemplary embodiment of FIG. 2.

Figure 14:
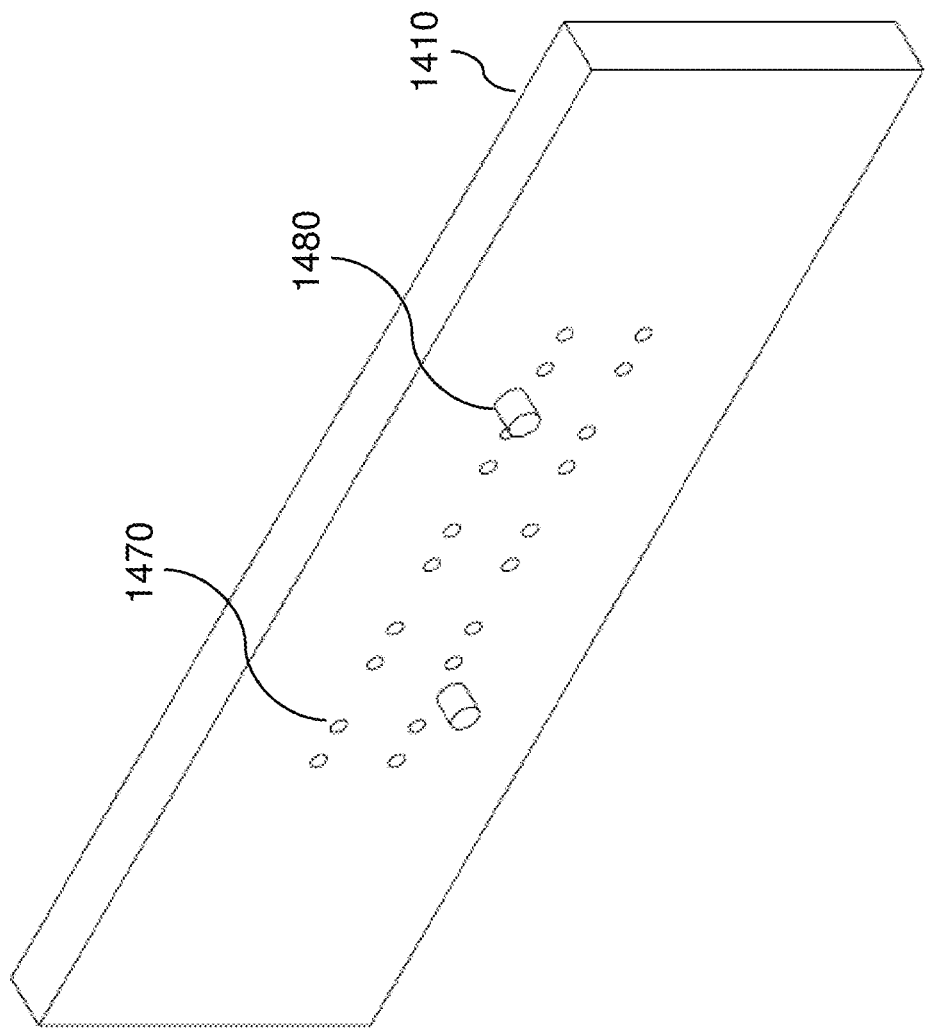
FIG. 14 shows an exemplary applicator base plate used to mount the cartridge shown in FIG. 12A for application of the fiber protection device.

The cartridge 820 of FIG. 12A, in combination with an applicator base plate (e.g., 1400 of FIG. 14 later described), may provide a mechanical system for safe and efficient application of the protection device to a connector end-face. For this, the cartridge 820 should be mounted onto the applicator base plate with the film 160 side of the cartridge 820 facing the applicator base plate. According to an embodiment of the present disclosure, the cartridge 820 is provided with a polarizing (alignment) pattern 1280 that guarantees correct orientation of the cartridge when mounted on the applicator base plate. Such polarizing pattern 1280 creates a mechanical interference with a structure of the applicator base plate that is cleared only when the cartridge 820 is correctly mounted (film 160 facing the applicator base plate). According to an exemplary embodiment, the polarizing pattern 1280 can comprise two holes, as shown in FIG. 12A, which extend through all the layers (e.g., 1220, 805, 160 and 1230 of FIG. 12B) of the cartridge 820. As can be seen in FIG. 14, such holes of the polarizing pattern 1280 correspond to structures (e.g., pins) 1480 of the applicator base plate 1400. A person skilled in art would clearly realize that other polarizing patterns can be envisioned with more or less degrees of complexity and therefore cost. Combination of two pins (e.g., 1480) and two holes (e.g., 1280) to create a mechanical interference pattern is a simple, efficient and low-cost solution to the polarization of the cartridge 820 for mounting onto the applicator base plate 1400. Other polarizing patterns can include one or more openings formed in the cartridge 820.

With continued reference to the cartridge 820 of FIG. 12A, perforate patterns 1260 delimit regions 1250 of the cartridge 820 containing one protection device that is defined by corresponding alignment opening 810. The perforate patterns 1260 are formed in the cover tape 1220, which is the top layer of the cartridge as shown in FIG. 12A.

According to an exemplary embodiment of the present disclosure and as shown in FIG. 12A, the perforate patterns 1260 may partition the cartridge in two rows and five columns, for a total of ten protection devices included in the cartridge 820. A person skilled in the art would clearly understand that such partitioning of the cartridge is purely exemplary in nature and a function of dimensions of the cartridge 820 and the connector end-face. Teachings according to the present disclosure can equally apply to connector end-faces of different dimensions (e.g., corresponding 20 MT-RJ, 40 MT-RJ type connectors) as well as to scaling up or down a dimension of the cartridge to include more or less protection devices. Such scaling up/down of the dimensions of the cartridge in view of dimensions of the connector end-faces can be regarded as parameters in the design of the cartridge according to the present teachings.

Furthermore, a person skilled in the art would clearly understand that the horizontal and vertical intersecting perforate patterns 1260 shown in FIG. 12A are purely exemplary in nature as other perforate patterns that delimit regions 1250 can be envisioned. Although the regions 1250 are shown as adjacent regions delimited by the (intersecting) perforate patterns 1260, other (non-intersecting) perforate patterns that form non-adjacent (not including a common perforate pattern) regions can be equally envisioned. In general, the perforate patterns 1260 may be formed by intersecting lines/curves or non-intersecting lines/curves.

Figure 12C:
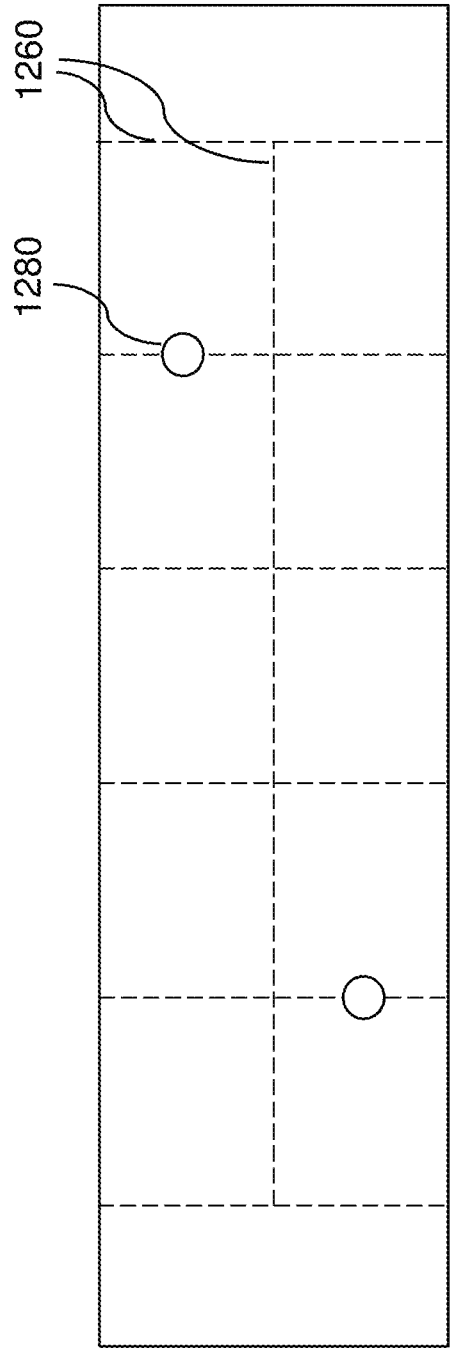
FIGS. 12C, 12D, 12E and 12F show top plan view details of each of the plurality of the stacked layers of the exemplary cartridge of FIG. 12B.

FIG. 12C shows a top plan view of the cover tape 1220, including the perforate patterns 1260 and polarizing pattern 1280. As previously described, the cover tape 1220 can provide protection to an adhesive side 825 of the film 160. The perforate patterns 1260 allow easy removal of a portion of the cover tape 1220, defined by region 1250 of FIG. 12A, corresponding to a protection device to be applied, thereby exposing the adhesive side 825 of the protection device for application on a connector end-face, while maintaining protection of the adhesive side 825 of other protection device of the cartridge 820. The cover tape 1220 may be adhesively applied onto the mechanical support 805. According to an embodiment of the present disclosure, the cover tape 1220 may have a thickness in a range of 50 microns to 500 microns and include a single adhesive side. A person skilled in the art would know of many off the shelf tapes, made of different materials, colors, and according to said thickness range, that may be used as the cover tape 1220 according to the present teachings.

Figure 12D:
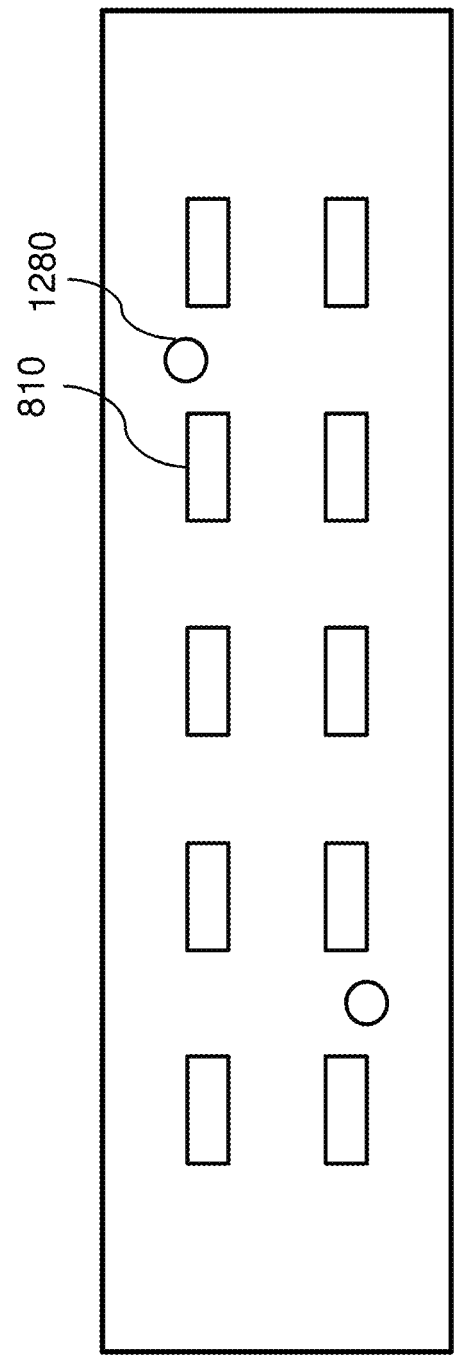

FIG. 12D shows a top plan view of the mechanical support 805, including the alignment openings 810 and the polarizing pattern 1280. The mechanical support 805 can provide structural rigidity to the cartridge 820 and mechanical support for holding the film 160. The alignment openings 810 can provide alignment of the fiber connector end-face to the film 160. The polarizing pattern 1280 provides a mechanical interference with a corresponding structure of the applicator base plate (1300 of FIG. 15) that clears only when the mechanical support 805 is oriented in a specific direction with respect to the applicator base plate. According to an exemplary embodiment of the present disclosure, the mechanical support may be made via injection moulding using a base material of, for example, polycarbonate, or other similar material known to a person skilled in the art. According to another exemplary embodiment of the present disclosure, the mechanical support 805 may be cut out from a sheet of material, via, for example, a laser cutting process or any other process capable of providing sizes and relative positioning of features (e.g., 810, 1280) of the mechanical support. The material of such sheet may be any material capable of providing the structural rigidity of the cartridge 820, and including material such polymers (e.g., plastic), metal, glass, ceramic or other organic or non-organic material.

According to an exemplary embodiment of the present disclosure, the mechanical support 805 may have a substantially uniform thickness in a range of 0.50 mm to 5.00 mm. Thickness of the mechanical support 805 of FIG. 12D may be based on the height h of the end portion 115 of the connector 110 (FIG. 1A, 1B) to be protected. Specifically, the thickness of the mechanical support 805 is smaller than the height h by an amount ε that is sufficiently large to allow the end portion 115 of the connector 110 to protrude through the mechanical support 805 by an amount that is sufficient to break the perforate pattern 802 of the film 160.

Figure 12E:
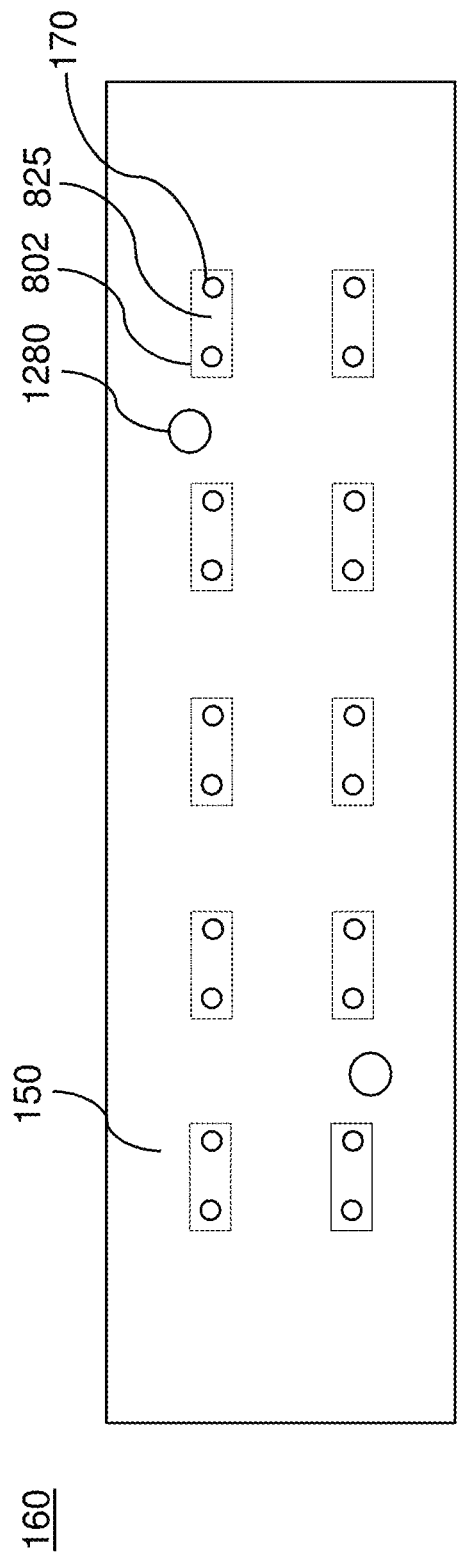

FIG. 12E shows a top plan view of the film 160, including the perforate pattern 802 that defines the fiber protection devices 150, the clearance 170 that allows guiding of pins (e.g., 120 of FIG. 1A) of the connector if present, and the polarizing pattern 1280. FIG. 12E shows the adhesive side 825 of the film 160 facing up, which is what the connector end-face sees during application of the fiber protection device 150. More description of the film 160, including thickness, material and layer composition, is provided above with reference to FIGS. 2-5 and 8. As can be seen in FIG. 12E, the perforate pattern 802 defines the fiber protection device 150 described with reference to FIG. 2, and therefore does not include tabs 260 discussed with reference to the fiber protection device 250 of FIG. 4.

Figure 12F:
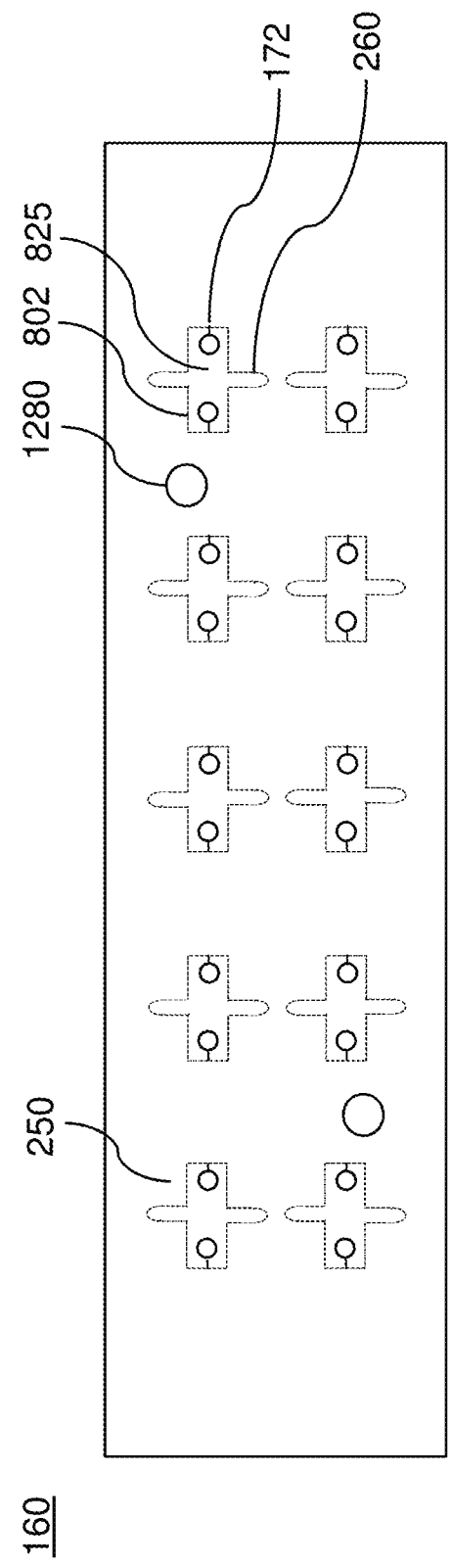

FIG. 12F shows a top plan view of the film 160, including the perforate pattern 802 that defines the fiber protection devices 250, the clearance 170 that allows guiding of pins (e.g., 120 of FIG. 1A) of the connector if present, and the polarizing pattern 1280. FIG. 12F shows the adhesive side 825 of the film 160 facing up, which is what the connector end-face sees during application of the fiber protection device 250. As can be seen in FIG. 12F, the perforate pattern 802 defines the fiber protection device 250 described with reference to FIG. 4, and therefore includes the tabs 260 discussed with reference to such figure. More description of the film 160 is provided above with reference to FIGS. 2-5 and 8. It should be noted that during application of the fiber protection device 250 via the cartridge 820, the end portion 115 of the connector 110 of FIGS. 1A-1B is inserted through the alignment opening 810 so to press against the film 160 thereby breaking the perforate pattern 802 while adhering the bulk of the fiber protection device 250 to the end-face 120 of the connector 110, at the exception of the tabs 260. When the protected connector is pulled away from the cartridge 820, the (loose) tabs 260 fold back and follow through the alignment opening 810 provided in the mechanical support 805 of the cartridge 820. Once the protected connector is completely removed from the cartridge 820, the tabs 260 may be folded and adhered onto the connector 110.

Figure 12G:
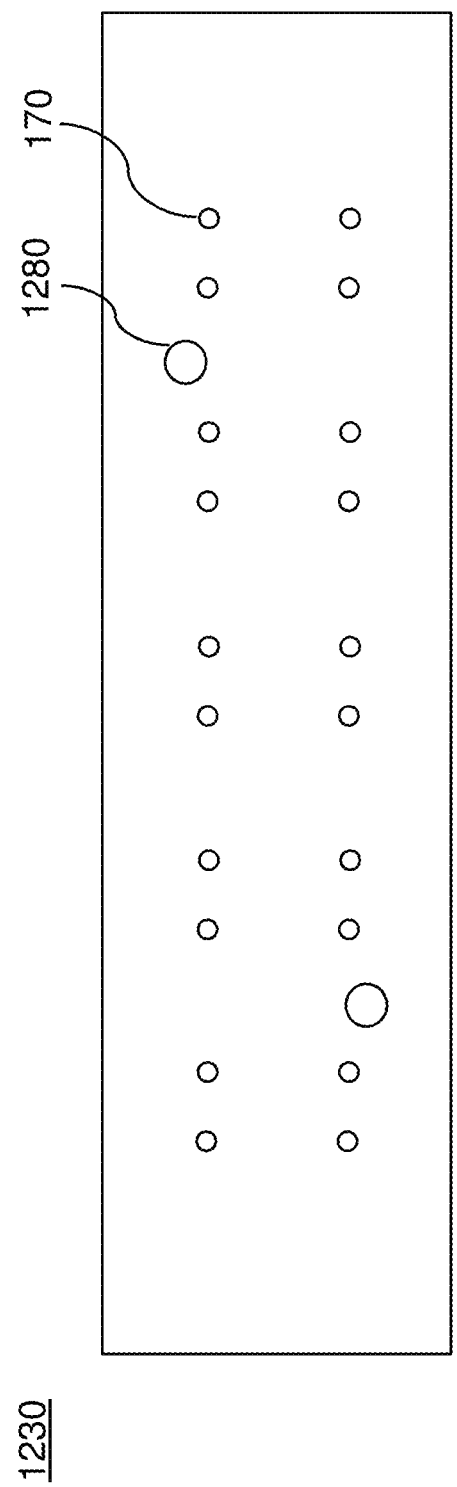
FIG. 12G shows an exemplary cushion layer used during application of the fiber protection device using the cartridge of FIG. 12A.

FIG. 12G shows a top plan view of the cushion layer 1230 which may be optionally provided with the cartridge 820. As described above, although the cushion layer 1230 may be required during application of the fiber protection device according to the present teachings, it may be provided as part of the cartridge 820, or part of the applicator base plate (e.g., 1300 of FIG. 15), or as a standalone layer to be inserted between between the cartridge 820 and the applicator base plate prior to application of the fiber protection device. As can be seen in FIG. 12G, the cushion layer 1230 includes the clearance 170 for guiding of pins (e.g., 120 of FIG. 1A) of the connector if present, and the polarizing pattern 1280.

With continued reference to FIG. 12G, as described above, the cushion layer 1230 protects the film 160 against scratches and damage during application of the protection device (e.g., 150, 250). The cushion layer 1230 may be made of a material that is soft enough not to scratch the film 160 during application. Such material may be a flexible and/or compressible material that provides, during application, compliance to the connector end-face (e.g., 120 of FIGS. 1A-1B). In turn, such compliance may allow a substantially uniform force exerted between the connector end-face and the film 160 so to promote uniform adhesion and outflow of any entrapped air between the connector end-face and the film 160 during application. The material of the cushion layer may be compressible enough to allow breaking of the perforate pattern 802 of the film 160 that define the protection device and thereby releasing the protection device from the cartridge 820 and onto the connector end-face.

According to an exemplary embodiment of the present disclosure, the cushion layer 1230 of FIG. 12G may be a silicon layer made, for example, of soft silicon rubber, and have a substantially uniform thickness (e.g., h1 shown in FIG. 13) in a range of 0.50 mm to 5.00 mm.

Figure 13:
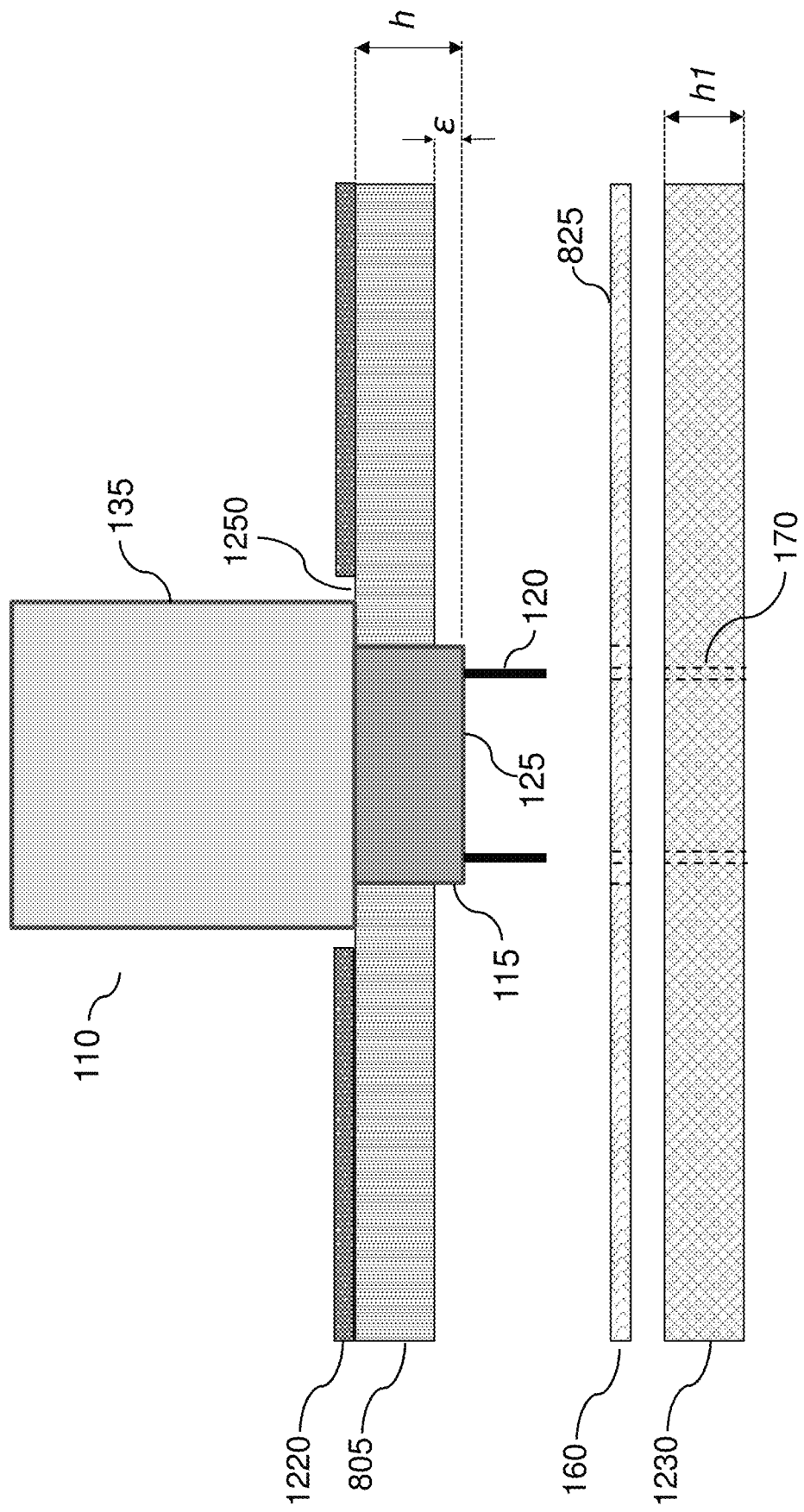
FIG. 13 shows an end portion of the fiber connector of FIG. 1A inserted through layers of the cartridge of FIG. 12A.

According to an exemplary embodiment of the present disclosure, and with reference to FIG. 13, the thickness h1 of the cushion layer 1230 may be based on the amount ε of the protrusion of the end portion 115 of the connector 110 allowed by the thickness of the mechanical support 805. According to an exemplary embodiment of the present disclosure, the thickness h1 of the cushion layer 1230 in an uncompressed state may be two times or more the amount ε. It should be noted that for clarity purposes, the layers of the cartridge 820 are shown in FIG. 13 as distanced. Furthermore, FIG. 13 shows the end portion 115 of the connector 110 inserted through the mechanical support 805 while a region 1250 of the cover layer 1220 is removed to expose the adhesive side 825 of the film 160 to the connector end-face 125.

FIG. 14 shows an exemplary applicator base plate 1400 used to mount the cartridge 820 shown in FIG. 12A for application of the fiber protection device. According to an exemplary embodiment of the present disclosure, the applicator base plate 1400 has a profile that conforms to the profile of the cartridge 820, including the cushion layer 1230. Accordingly, the applicator base plate 1400 has a main body 1410 with a substantially flat surface that can be mated to an entirety of a surface of the cartridge 820 to provide complete mechanical support of the cartridge 820 during application. According to an exemplary embodiment of the present disclosure, the surface of the main body 1410 of the applicator base plate 1400 and the surface of the cartridge 820, including the cushion layer 1230, are substantially of same dimensions. According to another exemplary embodiment of the present disclosure, the surface of the main body 1410 of the applicator base plate 1400 has dimensions that are larger than the dimensions of the surface of the cartridge 820.

With continued reference to FIG. 14, as previously described, the applicator base plate 1400 may comprise one or more structures 1480 that create a mechanical interference with the polarizing pattern 1280 of the cartridge, such mechanical interference cleared only when the cartridge 820 is correctly oriented/aligned with the applicator base plate 1400. As can be seen in FIG. 14, the exemplary structures 1480 may be in the shape of cylindrical pins fitted to the main body 1410 that are configured to slide into the polarizing pattern 1280 when a correct face of the cartridge 820 is presented to the applicator base plate 1400. Furthermore, a clearance(s) 1470 may be included in the main body of the applicator base plate 1400 that correspond to an extension of the clearance 170 of the cartridge 820. As described above, such clearance 1470 may be used during application of the fiber protection device to guide pins 120 of the connector 110 if present. Accordingly, provision of the clearance 1470 may not be considered required if the connector 110 is not expected to include the pins 120.

Material of the main body 1410 of the applicator base plate 1400 shown in FIG. 14 may be any hard (e.g., rigid and uncompressible) material, such as, for example, hard polymers, metal, glass, ceramic or other, such that, in combination with a thickness of the main body 1410, a shape of the main body 1410 is not deformed under pressure applied during application of the fiber protection device. A person skilled in the art would know of many suitable materials which can be further based on, for example, expected usage/storage environment, cost and manufacturability.

Although not shown in FIG. 14, according to an exemplary embodiment of the present disclosure, the cushion layer 1230 may be permanently mated to the applicator base plate 1400. Accordingly, the cushion layer 1230 may be glued onto the main body 1410 or simply press fitted through the polarizing pattern 1280. Provision of the cushion layer 1230 as part of the applicator base plate 1400 may advantageously reduce cost of the cartridge 820 and ensure that the film 160 of the cartridge 820 is always protected when mounted onto the applicator base plate 1400. On the other hand, provision of the cushion layer 1230 as part of the cartridge 820 ensures that the film 160 remains protected at all time, during storage and application, while increasing the cost of the cartridge 820.

Figure 15A:
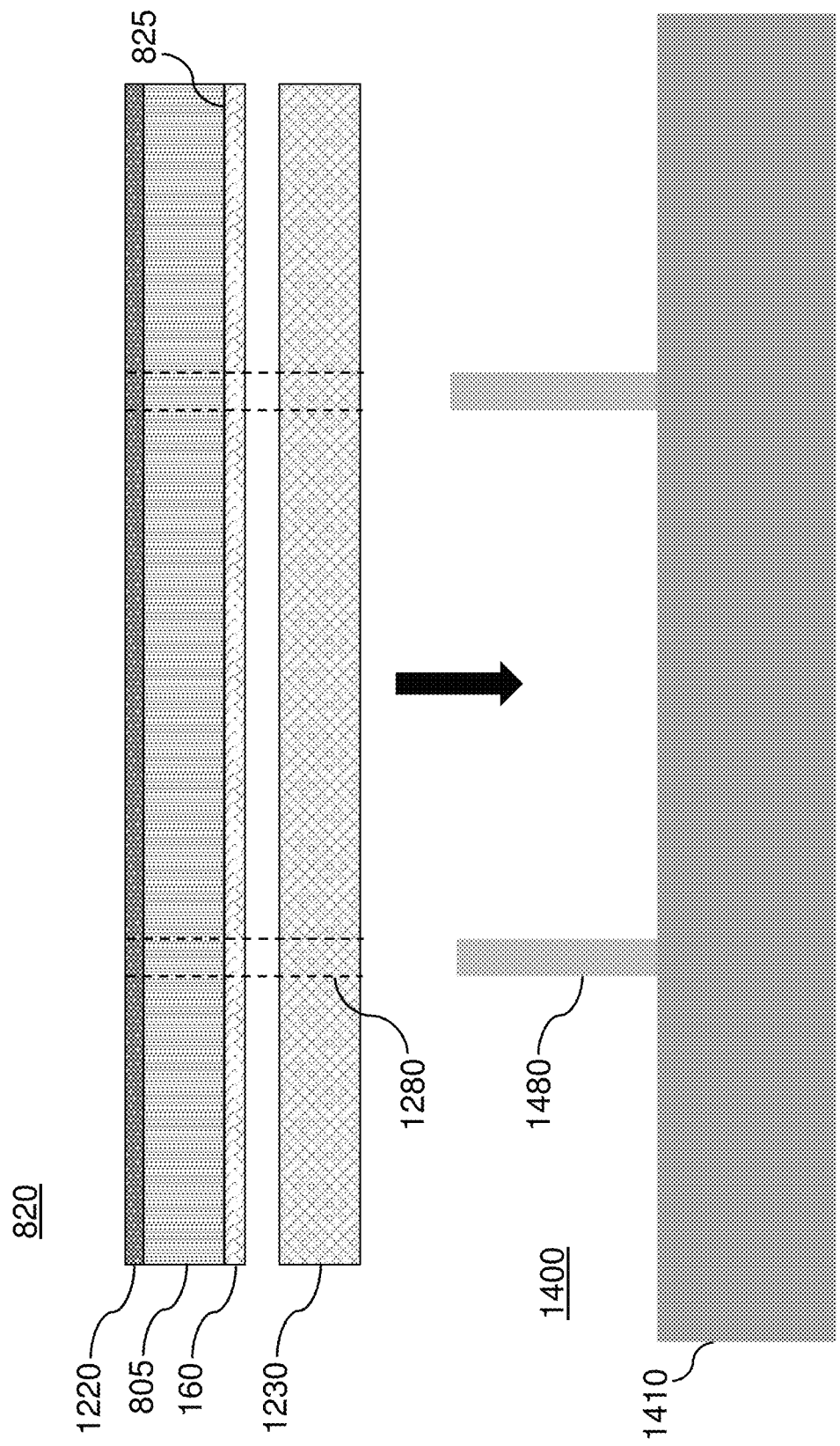
FIG. 15A shows an exemplary step of mounting the cartridge of FIG. 12A onto the applicator base plate of FIG. 14, including mounting of the cushion layer of FIG. 12G onto the applicator base plate.

FIG. 15A shows an exemplary step of mounting the cartridge 820 of FIG. 12A onto the applicator base plate 1400 of FIG. 14, including mounting of the cushion layer 1230 of FIG. 12G between the applicator base plate 1400 and the cartridge 820. As described above, the cushion layer 1230 may be separate or part of the cartridge 820. Mounting of the cartridge 820 and the cushion layer 1230 onto the applicator base plate 1400 may include alignment and orienting of the polarizing pattern 1280 of the cartridge 820 with the structure 1480 of the applicator base plate 1400 to clear a mechanical interference created between the polarizing pattern 1280 and the structure 1480. As described above, clearing of the mechanical interference automatically positions the adhesive side 825 of the film 160 facing away from the applicator base plate 1400.

Figure 15B:
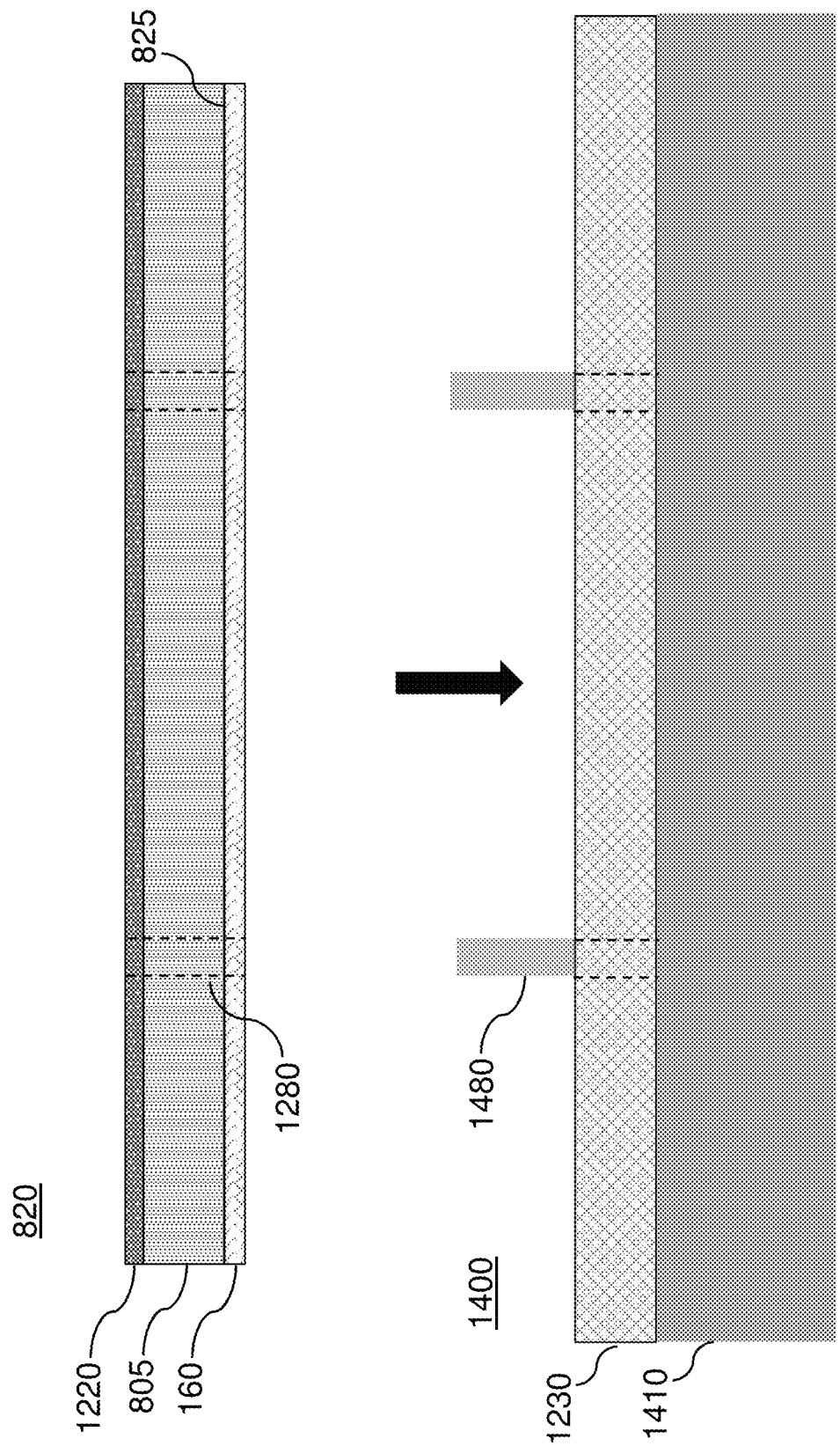
FIG. 15B shows an alternative step to the step shown in FIG. 15A of mounting the cartridge of FIG. 12A onto the applicator base plate of FIG. 14, wherein the cushion layer is part of the applicator base plate.

FIG. 15B shows an alternative step to the exemplary step shown in FIG. 15A of mounting the cartridge 820 of FIG. 12A onto the applicator base plate 1400 of FIG. 14 for a case where the cushion layer 1230 is part of the applicator base plate 1400. Similar to the step of FIG. 15A, mounting of the cartridge 820 onto the applicator base plate 1400, that is fitted with the cushion layer 1230, includes alignment and orienting of the polarizing pattern 1280 of the cartridge 820 with the structure 1480 of the applicator base plate 1400 to clear the mechanical interference created between the polarizing pattern 1280 and the structure 1480. As described above, clearing of the mechanical interference automatically positions the adhesive side 825 of the film 160 facing away from the applicator base plate 1400.

Figure 15C:
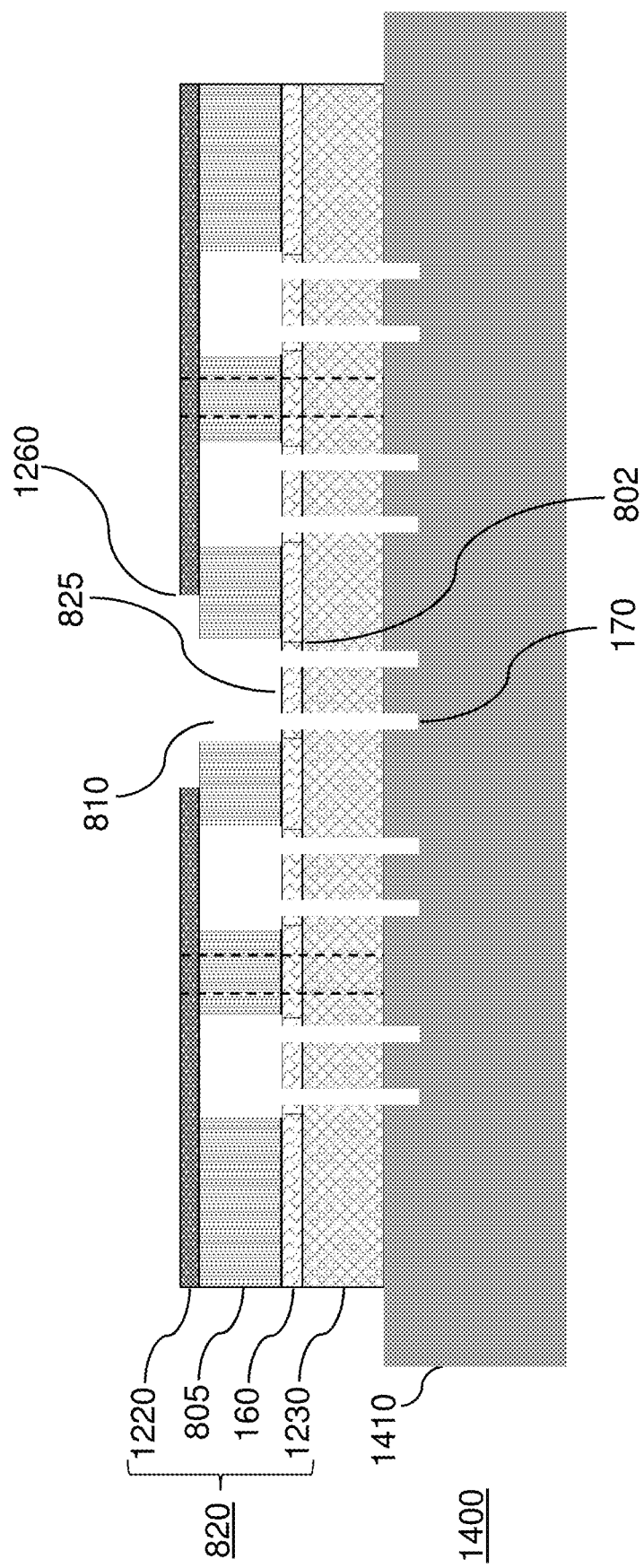
FIG. 15C shows the cartridge of FIG. 12A mounted onto the applicator base plate and ready for application of the fiber protection device onto a fiber connector.

FIG. 15C shows a cross-sectional view along the line AA' of FIG. 12A of the cartridge 820 of FIG. 12A mounted, via any one of the steps shown in FIGS. 15A and 15B, onto the applicator base plate 1400, and ready for application of the fiber protection device onto a fiber connector. As can be seen in FIG. 15C, the cover tape 1220 in a region 1250 of the cartridge 820 is removed by breaking a corresponding perforate pattern 1260 of the cover sheet 1220, thereby exposing the adhesive side 825 of the film 160 through an alignment opening 810 formed in the mechanical support 805.

Figure 15D:
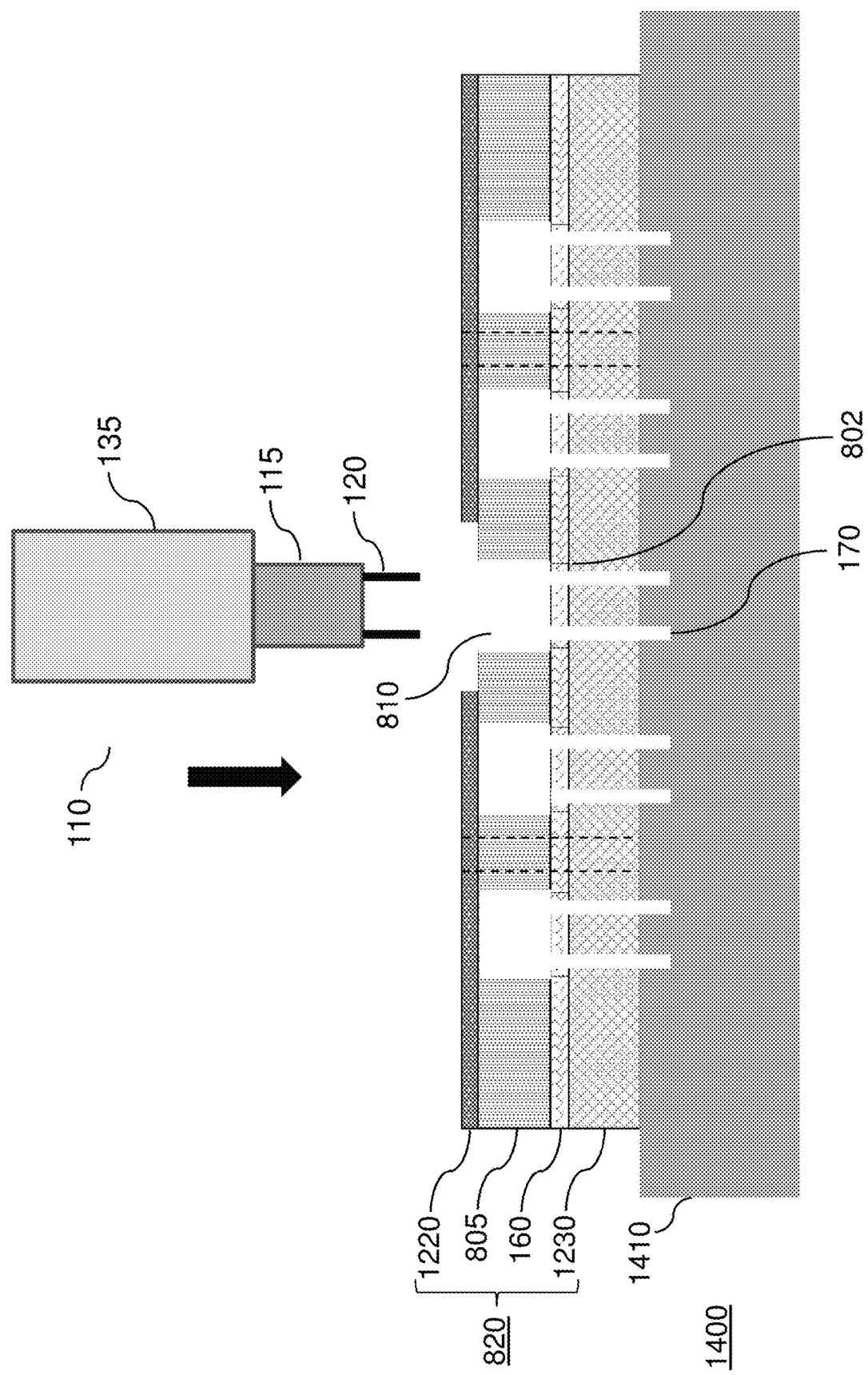
FIG. 15D shows a connector aligned with the mounted cartridge of FIG. 15C in preparation for application of the fiber connector device onto the connector end-face.

As shown in FIG. 15D, in a next step to one of FIG. 15C, a connector 110 is aligned with the alignment opening 810 in preparation to insertion of the connector 110 through the cartridge 820.

Figure 15E:
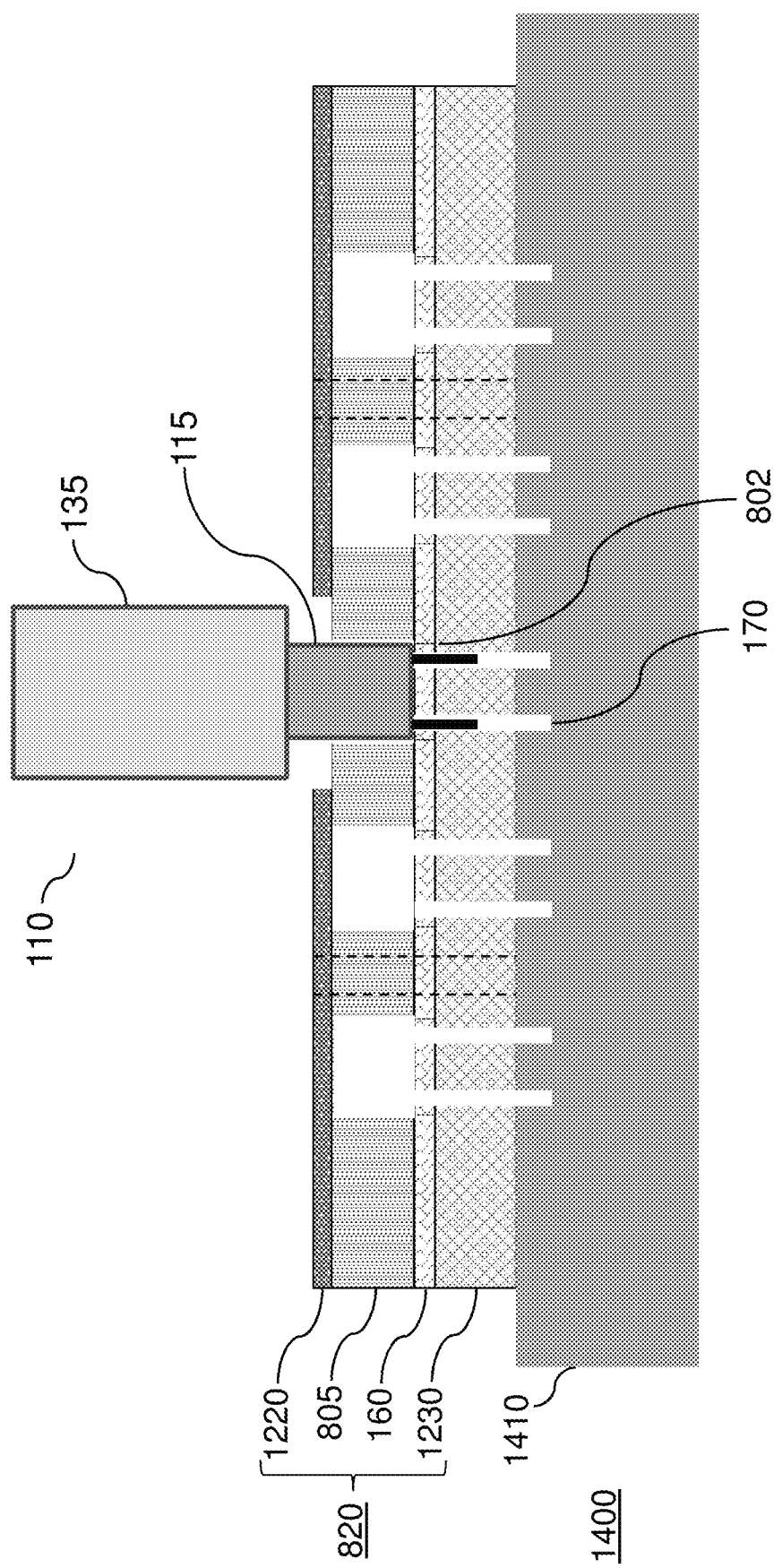
FIG. 15E shows the connector of FIG. 15D inserted into alignment openings of the cartridge and contacting an adhesive side of the fiber protection device.

In a following step, as shown in FIG. 15E, the end portion 115 of the connector 110 is inserted into the alignment opening 810 so that the end-face 125 of the connector 110 contacts the adhesive side 825 of the film 160 (in a region corresponding to a fiber protection device to be applied). Optional pins 120 of the connector 110 are guided through the clearances 170 and 1470 provided by the cartridge 820 and the applicator base plate 1400.

Figure 15F:
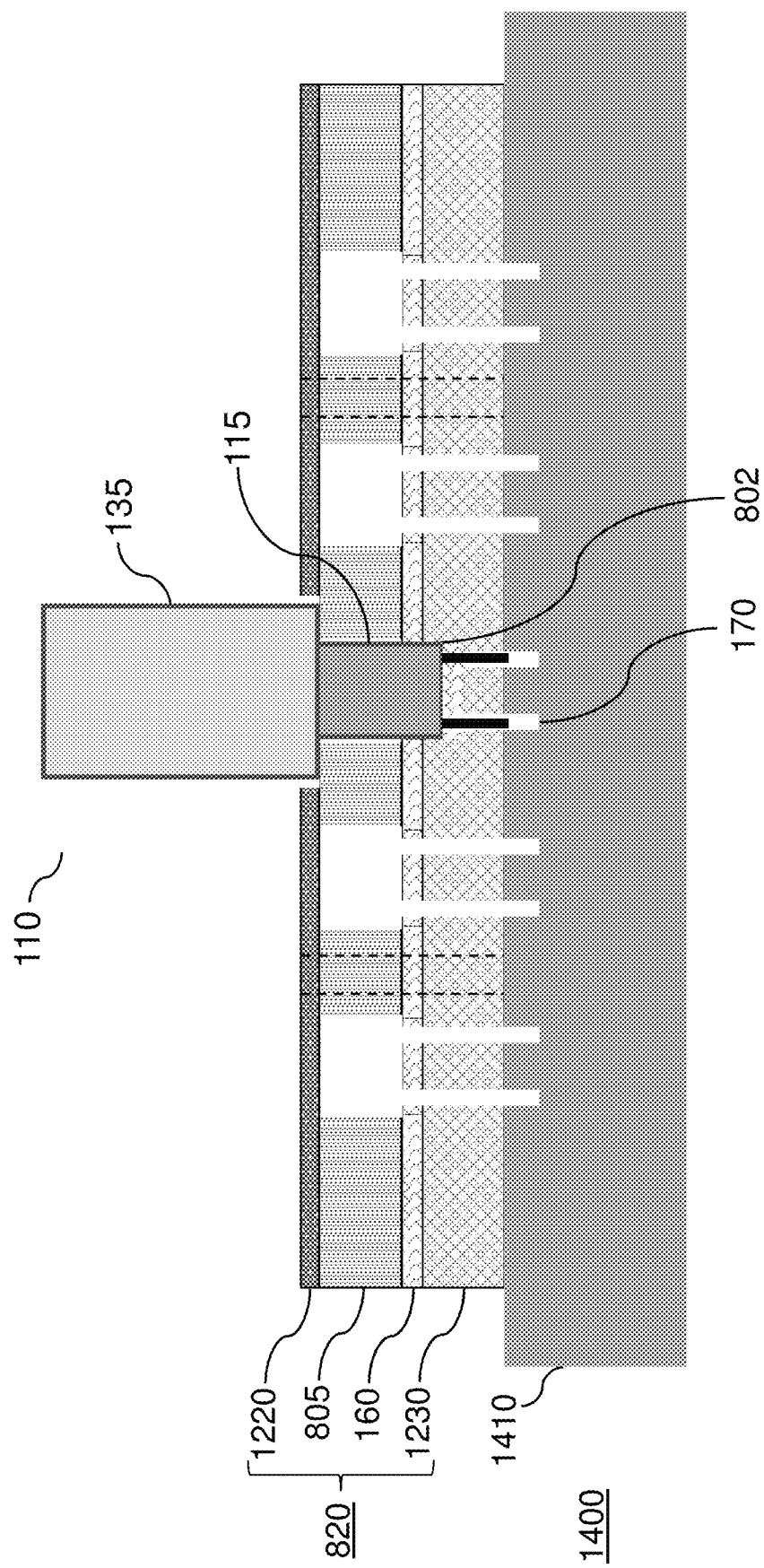
FIG. 15F shows the fiber protection device released from the cartridge and adhered to the connector of FIG. 15E.
Figure 15G:
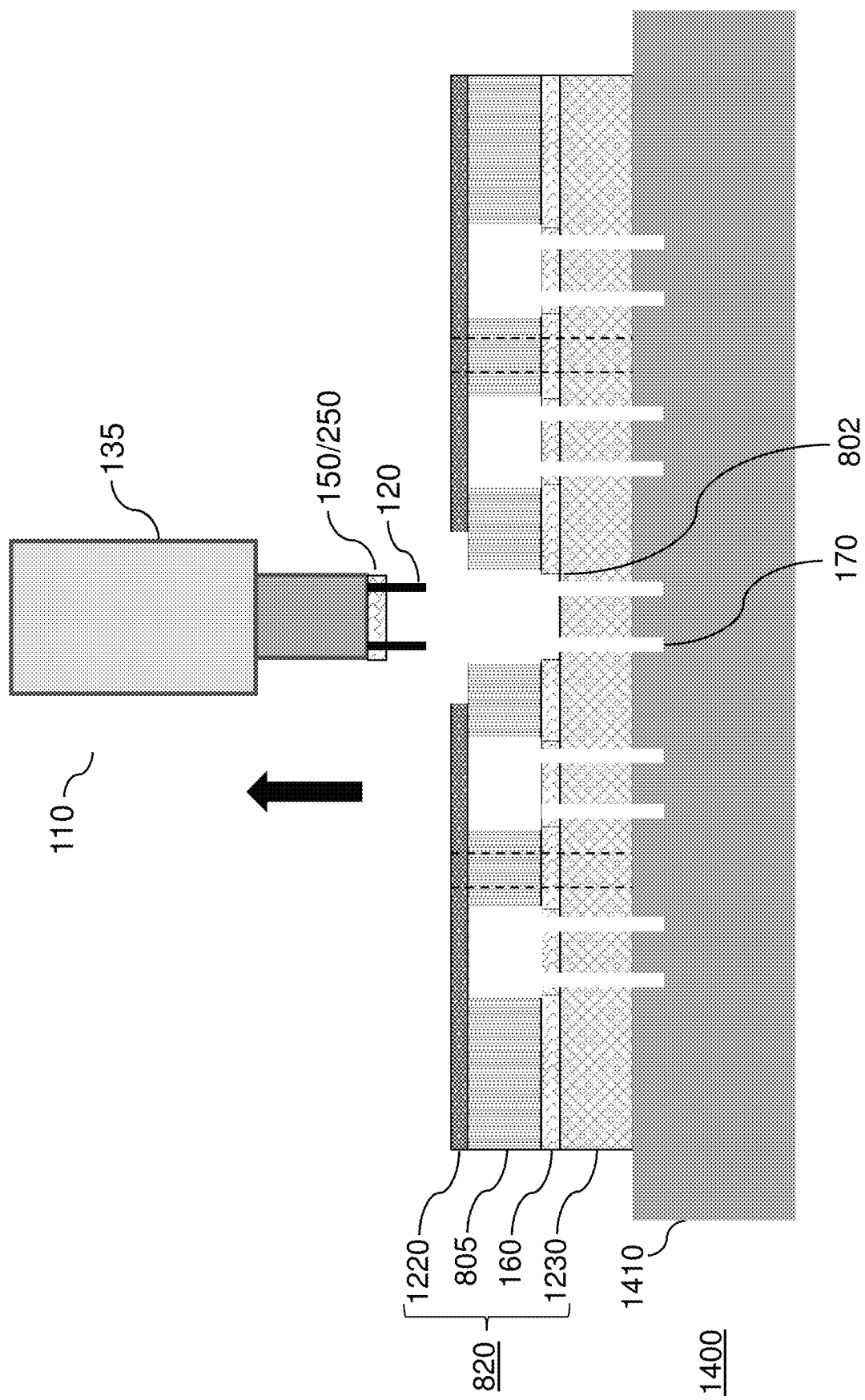
FIG. 15G shows the connector of FIG. 15E after application of the fiber protection device.

Applying pressure (force) to the connector 110 shown in FIG. 15E, breaks the perforate pattern 802 that defines the fiber protection device to be applied onto the connector end-face 125, thus, as shown in FIG. 15F, releasing the protection device, adhered onto the connector end-face 125, from the film 160. As described above and shown in FIG. 15E, the cushion layer 1230 compresses under pressure while providing compliance to the connector end-face 125. This in turn allows outflow of any air entrapped between the film 160 and the connector end-face 125 for an efficient adhesion of the fiber protection device onto said end-face, while protecting the film from any scratches.

Pulling the connector 110 shown in FIG. 15E out from the cartridge 820 results in a protected connector 110 that as shown in FIG. 15F, is fitted with a fiber protection device 150, 250. As can be clearly understood by a person skilled in the art, the mounted cartridge 820 shown in FIG. 15G can be used for application of more fiber protection devices that are shown in the cartridge 820, protected via the cover tape 1220. Removing a corresponding portion of the cover tape 1220 can be followed with the steps shown in FIGS. 15A-15E for application of another fiber protection device of the cartridge 820. Subsequently, the cartridge 820 can be dismounted from the applicator base plate 1400 and stored away for a next application of remaining fiber protection devices of the used cartridge 820.

As described above, the cartridge 820 in combination with the applicator base plate 1400 form a mechanical system for safe and efficient application of the protection device (e.g., 150, 250). In such mechanical system according to the present disclosure, the applicator base plate 1400 can be considered as a constant component for mounting of cartridges 820. On the other hand, the cartridges 820 can be considered as consumables configured for application of the one or more fiber protection devices fitted in each of the cartridges 820. Accordingly, application of a fiber protection device of the cartridge 820 may not be possible unless the applicator base plate 1400 is provided. In some cases, it may be desirable to allow quick, safe, and efficient application of a fiber protection device according to the present teachings without requiring the relatively bulky and heavy base plate 1400. It follows that according to an embodiment of the present disclosure a single use disposable pod that is configured to include a single protection device is provided. This is shown in FIG. 16A.

Figure 16A:
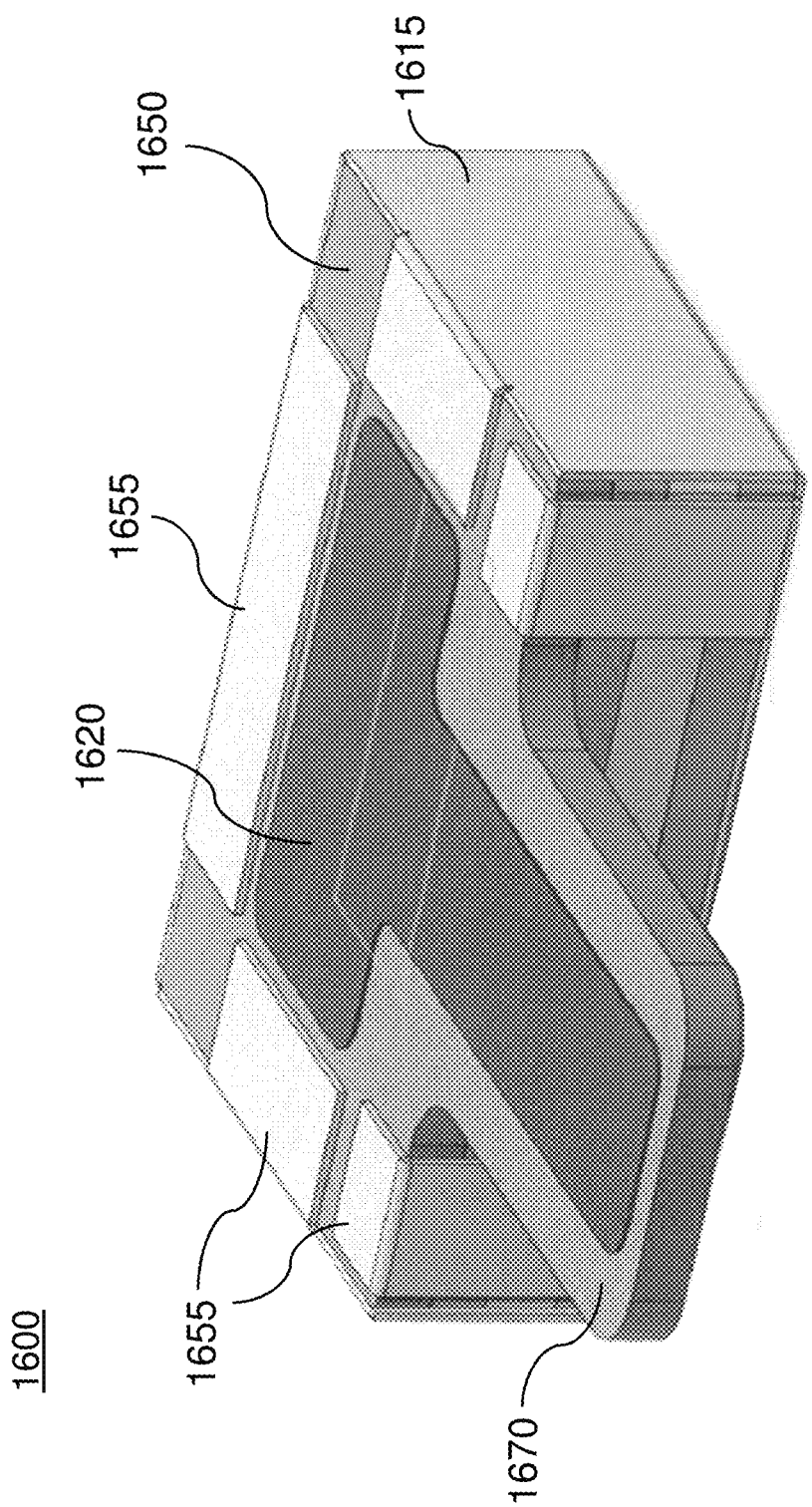
FIG. 16A shows a single-use disposable pod according to an exemplary embodiment of the present disclosure comprising stacked layers encased within a casing.

FIG. 16A shows a single-use disposable pod 1600 according to an exemplary embodiment of the present disclosure, for application of a single fiber protection device (e.g., 150, 250). The pod 1600 comprises a casing 1615 that encases a plurality of stacked layers 1650 based on the layers of the mechanical system provided by the combination of the cartridge 820 and the applicator base plate 1400 described above. In other words, the stacked layers 1650 provide substantially same functionality (and therefore made of same material and absolute/relative thicknesses) as the layers 1220, 805, 160, 1230 and 1410 (e.g. per FIG. 15G) for a case where the one or more fiber protection devices is reduced to a single fiber protection device. Due to its small size and relative light weight, the pod 1600 can be easily carried for onsite application when needed. Once used, the pod 1600 can be disposed.

With continued reference to FIG. 16A, since the stacked layers 1650 are pre-arranged and encased within the casing 1615, no polarizing pattern (e.g., 1280) may be needed. According to an exemplary embodiment, the casing 1615 may include clamps 1655 to steadily hold/clamp the stacked layers 1650 within the casing 1615. According to a further exemplary embodiment, a holding tab 1670 may be provided with the pod 1600 to facilitate steady holding of the pod 1600 during application of the fiber protection device as well as ease removal of the cover tape 1620.

Figure 16B:
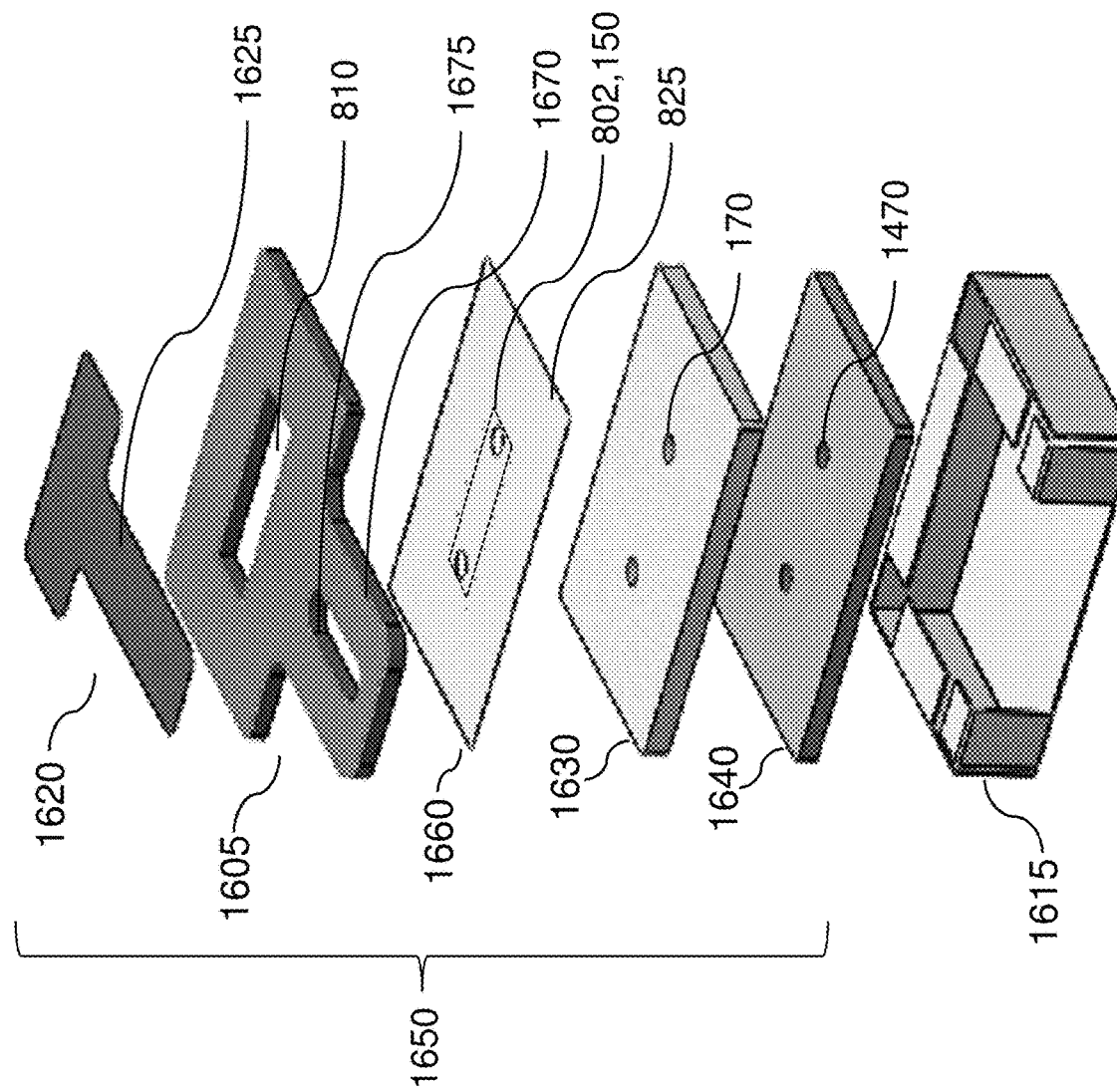
FIG. 16B shows details of the stacked layers of the single-use disposable pod of FIG. 16A.

FIG. 16B shows details of the stacked layers 1650 of the single-use disposable pod 1600. These include the cover tape 1620 that is equivalent in functionality to the cover tape 1220 of the cartridge 820, the mechanical support 1605 that is equivalent in functionality to the mechanical support 805 of the cartridge 820, the film 1660 that is equivalent in functionality to the film 160 of the cartridge 820, the cushion layer 1630 that is equivalent in functionality to the cushion layer 1230, and the base plate 1610 that is equivalent in functionality to the main body 1410 of the applicator base plate 1400.

Based on the above description and figures related to the cartridge 820 and the applicator base plate 1400, functionality of the stacked layers 1650 of the single-use disposable pod 1600 should be clear. For example, as shown in FIG. 16B, the mechanical support 1605 of the single-use disposable pod 1600 is provided with the alignment opening 810 that has the same functionality as the alignment opening 810 of the mechanical support 805 of the cartridge 820. A person skilled in the art can clearly make parallels between the clearances 170 provided to the layers 1660 and 1630 of the single-use disposable pod 1600 shown in FIG. 16B, and layers 160 and 1230 of the cartridge 820 shown in FIGS. 12A-12G. Similar parallels can be made between clearances 1470 provided to the layer 1640 of the single-use disposable pod 1600 shown in FIG. 16B and to the main body 1410 of the applicator base plate shown in FIG. 14. Thicknesses (absolute or relative) and material used for the layers of the two configurations may also be same.

As described above, the single-use disposable pod 1600 of FIGS. 16A and 16B may include a holding tab 1670 that protrudes (extends from) a main common surface area of the stacked layers 1650. An opening 1675 within the holding tab 1670 may be provided to facilitate removal of the cover tape 1620 by allowing lifting a tab region 1625 of the cover tape 1620 through the opening 1675 for peeling off the tab region 1670, and therefore the entire cover tape 1620. As can be clearly taken from FIGS. 16A and 16B, the tab region 1620 of the cover tape 1620 extends from a main body of the cover tape 1620 so to overlap a region of the holding tab 1670 that includes the opening 1675. A person skilled in the art would realize that such overlap may be a partial overlap of the holding tab 1670 (e.g., per FIG. 16A) or a full overlap (not shown). As in the case of the cartridge 820 described above, removal of the cover tape 1620 may be performed in preparation for application of the fiber protection device (e.g., 150, 250) by exposing the adhesive side 825 of the film 1660.

Figure 16C:
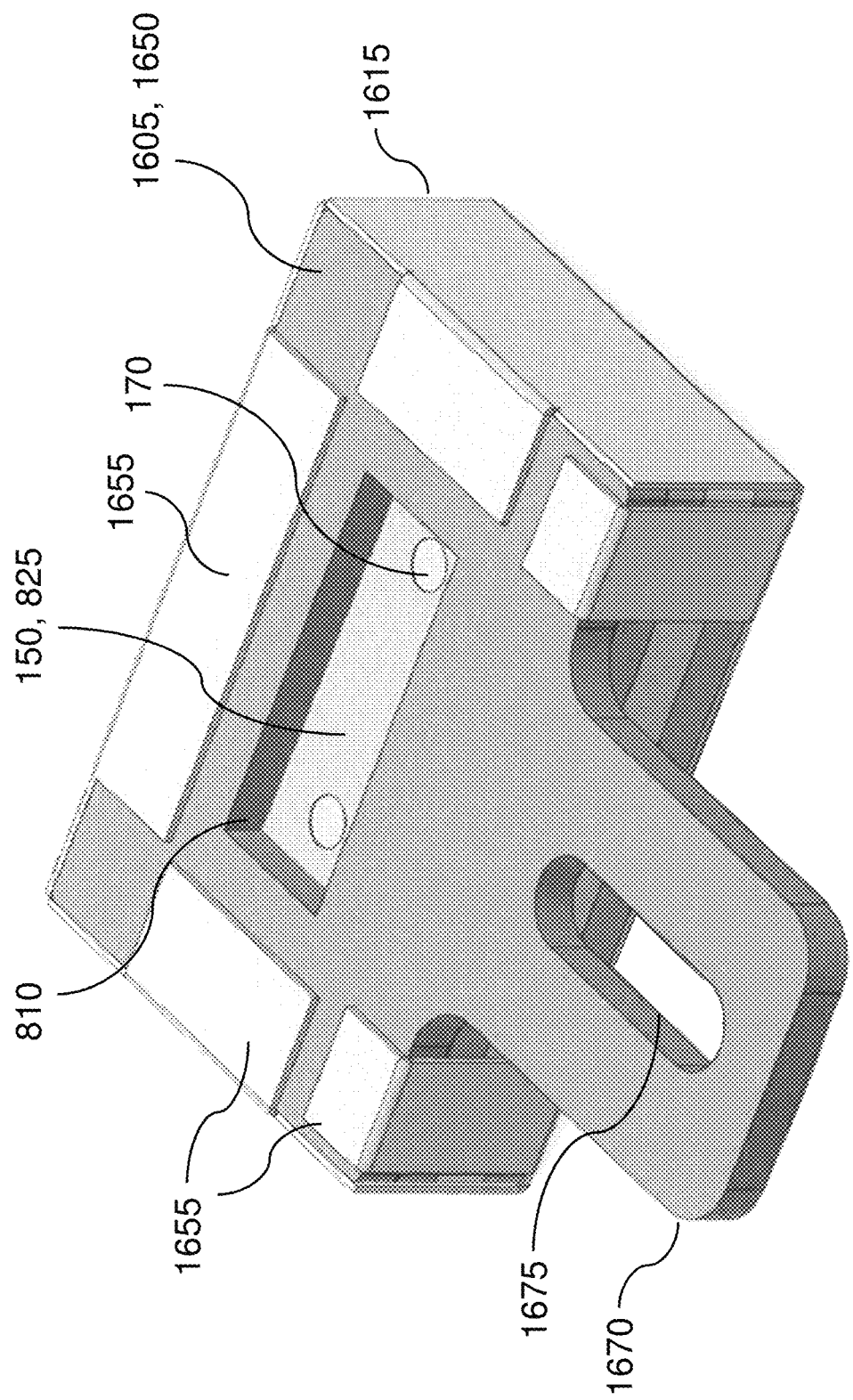
FIG. 16C shows the single-use disposable pod of FIG. 16A with a cover tape removed in preparation for application of a fiber protection device.

FIG. 16C shows the single-use disposable pod 1600 according to the present teachings with the cover tape 1620 removed. Accordingly, the adhesive side 825 of the of the fiber connection device 150 is exposed through the alignment opening 810 formed in the mechanical support 1605. Application of the fiber protection device 150 can therefore be performed by following steps similar to the steps described above with reference to FIGS. 15C-15G. During application, the pod 1600 may be positioned on a hard and flat surface, or alternatively held by hand using the case 1615 and/or the holding tab 1670.

A person skilled in the art would clearly understand that design of the casing 1615 may be according to a variety of configurations which are beyond the scope of the present disclosure. Accordingly, any casing that can steadily hold the stacked layers 1650 may be used in the single-use disposable pod 1600 of the present teachings. In other words, steadily holding via the clamps 1655 of FIG. 16A may be one possible configuration of many. For example, FIG. 17A shows a single-use disposable pod 1700 that comprises substantially same stacked layers 1650 as the pod 1600 but encased in a casing 1715 that uses a snap and clip mechanism for steadily holding the stacked layers 1650, rather than the clamps 1655 of the pod 1600.

Figure 17A:
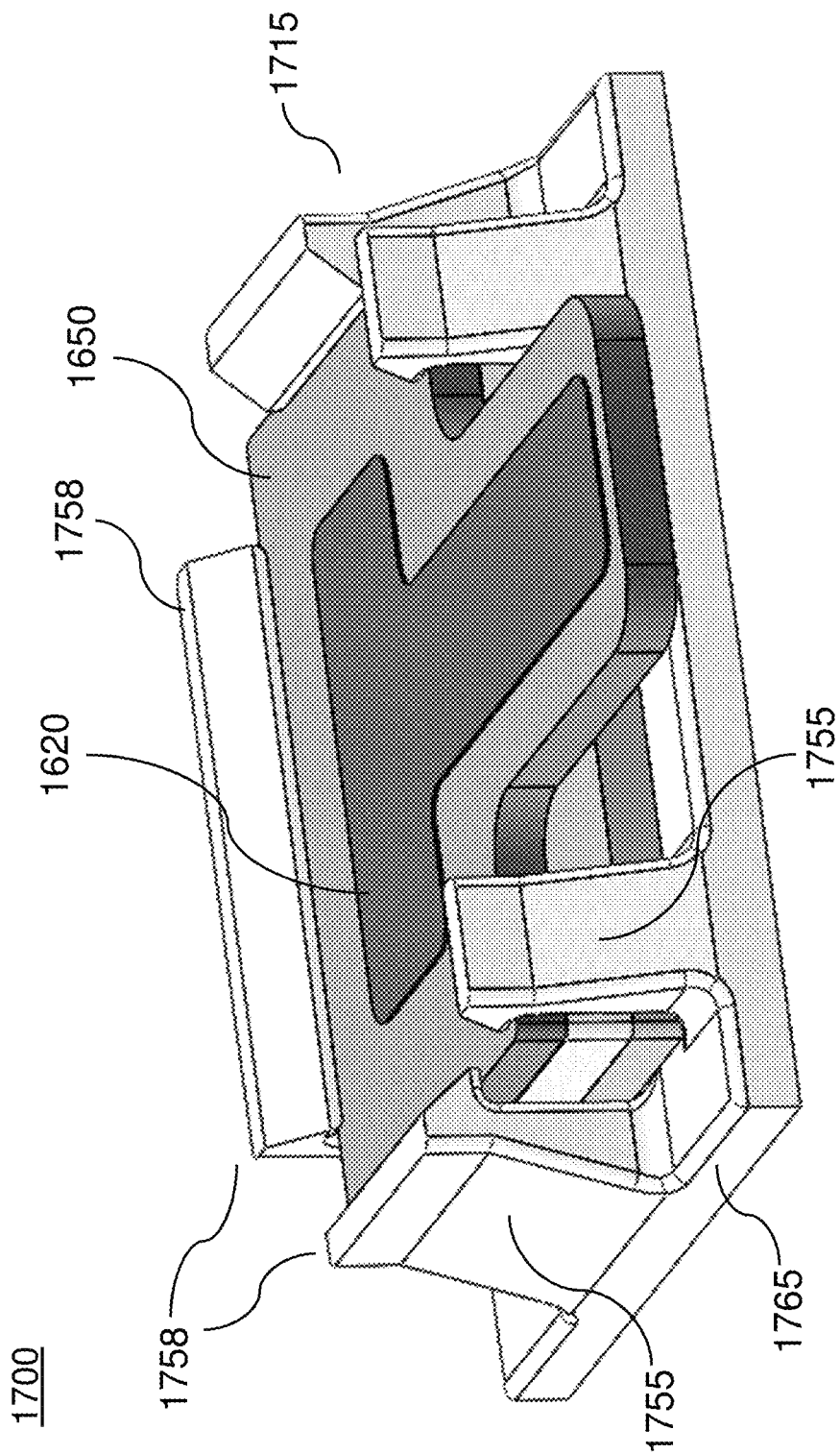
FIG. 17A shows an alternative exemplary embodiment according to the present disclosure of a single-use disposable pod comprising a casing fitted with a snap and clip mechanism.
Figure 17B:
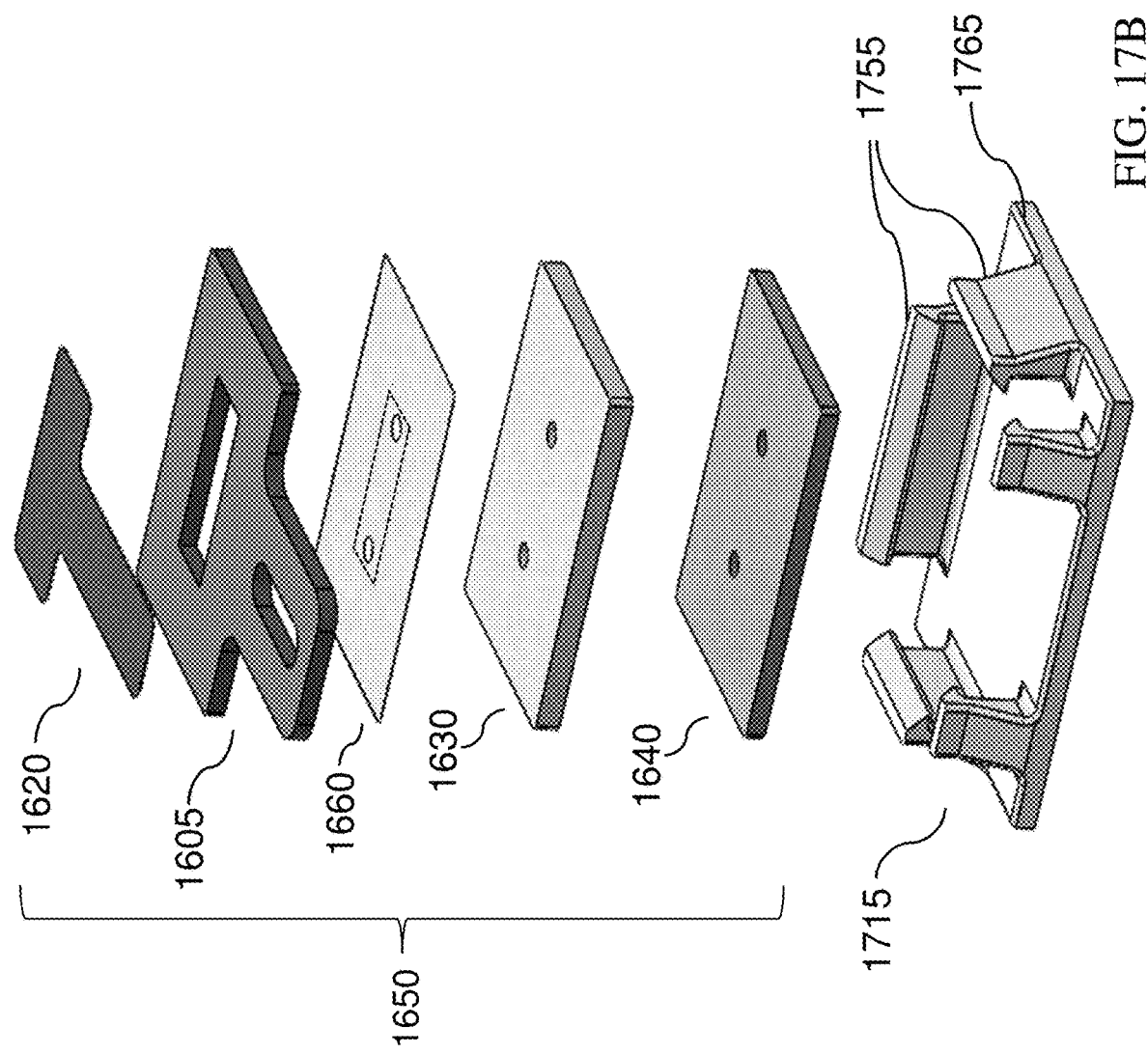
FIG. 17B shows further details of the stacked layers of the single-use disposable pod of FIG. 17A.

FIG. 17A shows an alternative exemplary embodiment according to the present disclosure of a single-use disposable pod 1700 comprising a casing 1715 fitted with a snap and clip mechanism to steadily hold the stacked layers 1650. As can be seen in FIG. 17A, the casing 1715 comprises a main support plate 1765 upon which flexible clips 1755 are formed. The tips of the clips 1755 are shaped as lips 1758 that are designed to restrict a top opening into the casing 1715 by a sloped surface of lips 1758. Accordingly, pushing the stacked layers 1650 from the top opening into the casing 1715 flexes the clips 1755 outwardly till the lips 1758 are cleared from the region of the lips 1758. Once the lips 1758 are cleared, the clips 1755 relax (snap back) and steadily hold the stacked layers 1650 within the casing 1715. It would be clear to a person skilled in the art that the stacked layers 1650 are held from a vertical move by the top surface of the main support plate 1765 and a bottom surface of the clips 1755. Accordingly, a distance between such two surfaces should substantially match a height of the stacked layers 1650 (not including, in some cases, the cover tape 1620). Further details of the stacked layers 1650 of the single-use disposable pod 1700 are shown in FIG. 17B. Description of such stacked layers 1650 can be found in the above description as related to FIG. 16B.

Figure 18:
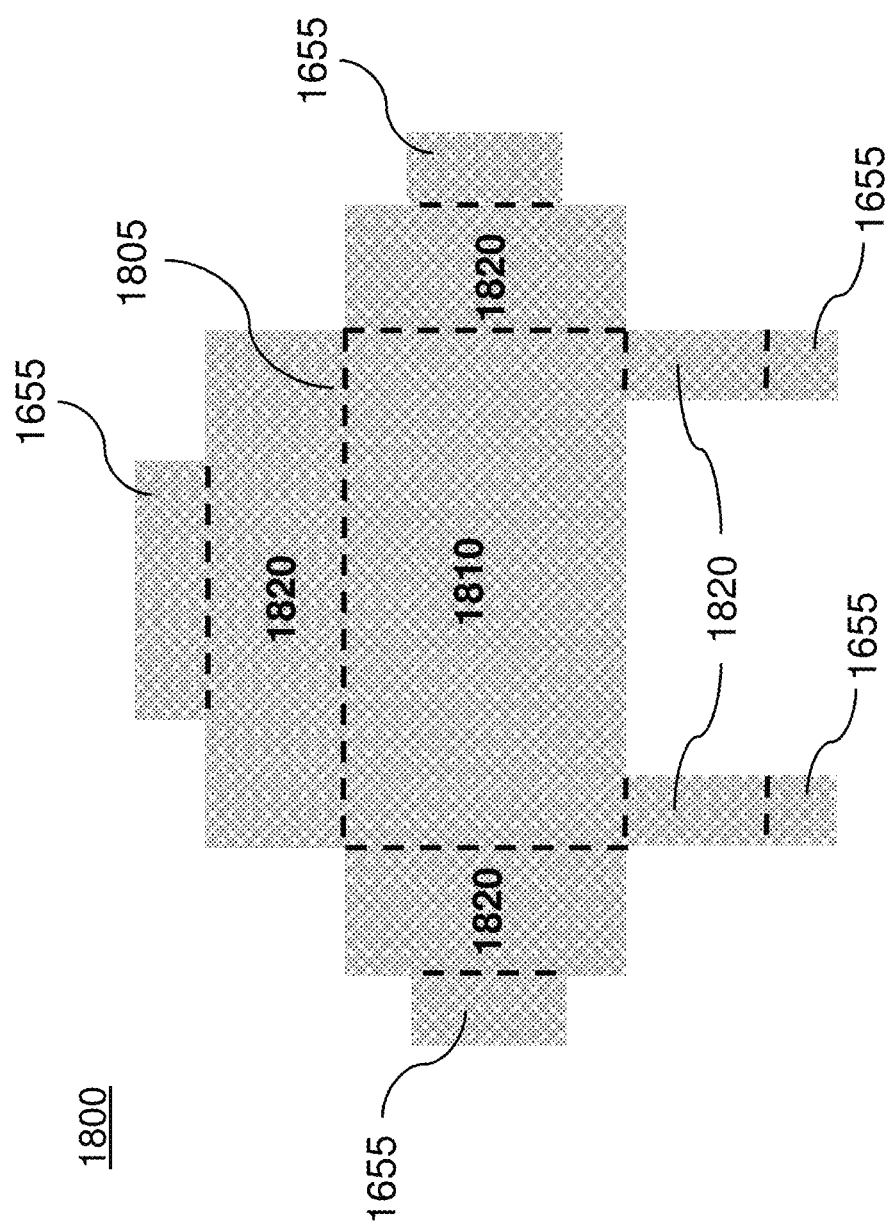
FIG. 18 shows an exemplary single stamped metal part used to form the casing of the single-use disposable pod of FIG. 16A.

Cost, manufacturability and environmental use of the single-use disposable pod according to the present teachings may dictate design/material of the casing (e.g., 1615, 1715). The two exemplary casing 1615 and 1715 described above can be made at low cost using different manufacturing methods and materials. For example, the casing 1715 can be made as a single injection molded part using known methods and materials (e.g., polymers). On the other hand, the casing 1615 can be made via a single (flat) stamped metal part, such as the exemplary stamped metal part 1800 of FIG. 18, that is folded (e.g., inwards toward center (base 1810) of the metal part), along dotted lines 1805 shown in FIG. 18, to form a three dimensional structure of the casing 1615, including a base 1810, sidewalls 1820 and the clamps 1655. It would be clear to a person skilled in the art that the clamps 1655 may be folded last and after fitting the stacked layers 1650 within the sidewalls 1820.

Figure 19:
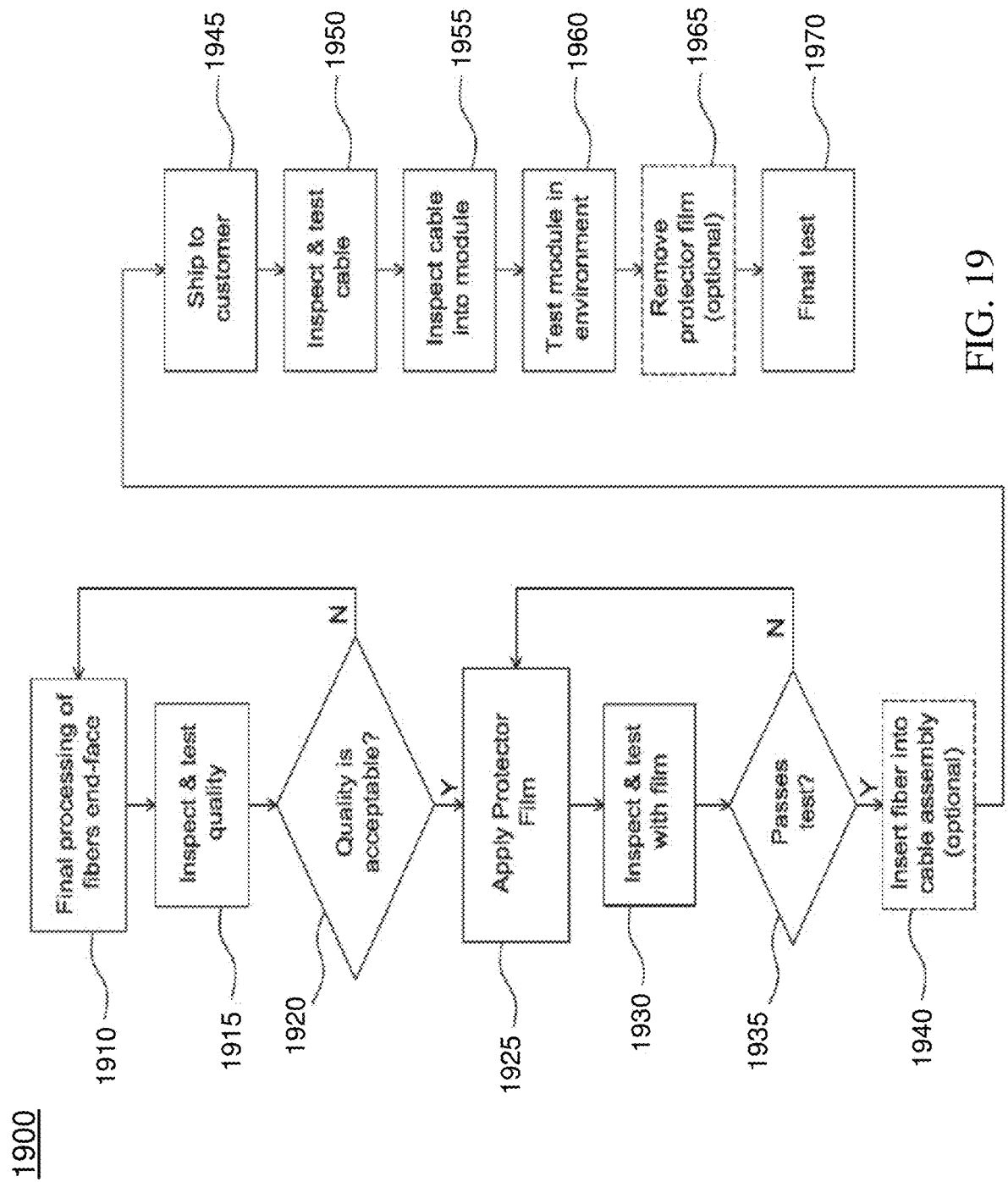
FIG. 19 shows an exemplary process using a film-based fiber protection device.

FIG. 19 is a process flow 1900 illustrating an example of film protection application. First, the ferrule has final processing the fiber end-face 1910. At this point the fiber ends are in their final state, such as polished or cleaved. These fibers are then inspected and tested for quality 1915 (for example, optical inspection with an interferometer and optical coupling tests). If the quality is not acceptable 1920, the ferrule may be re-processed. If acceptable 1920, the film is applied 1925 via any of the cartridge 820 or the single-use disposable pod 1600 of the present teachings. Then the ferrule is inspected and tested 1930. If the ferrule does not pass the test 1935, the film is re-applied 1925. If the ferrule passes the test 1935, it is optionally assembled into a higher level cable 1940. The cable is shipped to a customer 1945. The customer can inspect and test the cable 1950, insert the cable in a module 1955 and test the module in environmental conditions 1960. After testing the film can be optionally removed 1965 or left in place for final test 1970 and system integration.

In view of the above, it should be appreciated by one skilled in the art that the functional blocks, methods, devices and systems described in the present disclosure may be integrated or divided into different combinations of systems, devices, and functional blocks, as would be known to those skilled in the art.

For example, while the process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system for application of one or more optical fiber protection devices to fiber ferrule end-faces, comprising:
   a cartridge comprising stacked layers of a substantially same planar shape arranged one above another, comprising in order from a top layer to a bottom layer:
   a mechanical support comprising alignment openings that correspond to a profile of a fiber ferrule end-face;
   an adhesive film adhered to a bottom surface of the mechanical support, the adhesive film comprising perforate patterns that are aligned with the alignment openings and define outlines of the one or more optical fiber protection devices formed in the adhesive film;
   an applicator base plate used for mounting of the cartridge during application of the one or more optical fiber protection devices, and
   a cushion layer, formed by a compressible material, that is arranged during application of the one or more optical fiber protection devices, below the adhesive film of the stacked layers and above the applicator base plate, wherein when applied to the fiber ferrule end-face, an optical fiber protection device of the one or more optical fiber protection devices flexibly conforms around exposed optical fiber ends in the fiber ferrule end-face.

2. The system according to claim 1, wherein the adhesive film has an index of refraction between approximately 1.1-2.2, and a Rockwell scale E hardness of between approximately 30-150.

3. The system according to claim 2, wherein the adhesive film has a thickness in a range of 25 to 50 microns.

4. The system according to claim 3, wherein the adhesive film comprises:
a transparent film formed from a material comprising polyimide, polyethylene, polyurethane, or silicone; and
a transparent adhesive layer having a thickness of less than 25 microns.

5. The system according to claim 4, wherein the transparent adhesive layer is configured to leave essentially no residues on the fiber ferrule end-face after removal of the optical fiber protection device.

6. The system according to claim 1, wherein the mechanical support has a thickness in a range of 0.50 to 5.00 mm.

7. The system according to claim 6, wherein the thickness of the mechanical support is smaller than a height of an end portion of the fiber ferrule end-face by an amount that is sufficient to break a perforate pattern of the adhesive film during application of the optical fiber protection device.

8. The system according to claim 1, wherein the mechanical support is a single piece support formed though injection molding.

9. The system according to claim 1, wherein the stacked layers of the cartridge further comprise:
an adhesive cover tape adhered to a top surface of the mechanical support, the adhesive cover tape configured to individually protect an adhesive side of each of the one or more optical fiber protection devices.

10. The system according to claim 9, wherein individual protection of the adhesive side of each of the one or more optical protection devices is provided via perforate patterns formed in the adhesive cover tape that provide a mechanical release for separation of a region of the adhesive cover tape corresponding to each of the alignment openings.

11. The system according to claim 1, wherein the cushion layer formed by the compressible material is configured, during application of the optical fiber protection device, to sufficiently compress so as to allow release of the optical fiber protection device.

12. The system according to claim 11, wherein a thickness of the cushion layer in an uncompressed state is in a range of 0.50 to 5.00 mm.

13. The system according to claim 11, wherein the thickness of the cushion layer is at least two times a difference between a height of an end portion of the fiber ferrule end-face and a thickness of the mechanical support.

14. The system according to claim 1, wherein a combination of the cartridge and the cushion layer comprises a polarizing pattern configured to provide a mechanical interference with the applicator base plate for mounting of the cartridge during application of the optical fiber protection device.

15. The system according to claim 14, wherein the polarizing pattern comprises one or more openings through the stacked layers and the cushion layer.

16. The system according to claim 15, wherein the applicator base plate comprises:
a main body of a substantially planar shape with dimensions equal to or greater than dimensions of the cartridge;
a protruding structure configured to clear the mechanical interference of the polarizing pattern for mounting of the cartridge only when an adhesive side of the adhesive film faces away from the main body.

17. The system according to claim 16, wherein the protruding structure comprises pins.

18. The system according to claim 1, wherein the cushion layer is part of one of: a) the applicator base plate, and b) the stacked layers.

19. The system according to claim 1, wherein the optical fiber protection device is configured to prevent contamination of the exposed optical fiber ends and reduce Fresnel reflections.

20. A method for protecting a fiber ferrule end-face, comprising:
providing the system according to claim 1;
mounting the cartridge of said system on the applicator base plate, the applicator base plate having a main body of a substantially planar shape with dimensions equal to or greater than dimensions of the cartridge;
based on the mounting, orienting an adhesive side of the adhesive film away from the main body;
inserting an end portion of the fiber ferrule end-face through an alignment opening of the mechanical support;
based on the inserting, adhering an optical fiber protection device of the one or more fiber protection devices onto the fiber ferrule end-face; and
pressing the end portion of the fiber ferrule end-face thereby releasing the optical fiber protection device from the cartridge.

21. The method according to claim 20, wherein the mounting of the cartridge comprises:
sandwiching the cushion layer between the main body and the cartridge.

22. The method according to claim 20, further comprising:
prior to the inserting:
removing a portion of an adhesive protective tape adhered to a top surface of the mechanical support of the cartridge, thereby exposing the adhesive side of the adhesive film.

* * * * *